United States Patent
Watson et al.

(10) Patent No.: US 12,490,711 B2
(45) Date of Patent: *Dec. 9, 2025

(54) PET CARRYING BACKPACK

(71) Applicant: K9 Sport Sack LLC, Lehi, UT (US)

(72) Inventors: Joseph Watson, Lehi, UT (US); Daniel Bussio, Orem, UT (US)

(73) Assignee: K9 Sport Sack LLC, Lehi, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/632,597

(22) Filed: Apr. 11, 2024

(65) Prior Publication Data

US 2024/0276949 A1  Aug. 22, 2024

Related U.S. Application Data

(63) Continuation of application No. 17/694,431, filed on Mar. 14, 2022, now Pat. No. 11,997,984, which is a continuation of application No. 16/841,640, filed on Apr. 6, 2020, now Pat. No. 11,272,685, which is a
(Continued)

(51) Int. Cl.
| | |
|---|---|
| *A01K 1/02* | (2006.01) |
| *A45C 7/00* | (2006.01) |
| *A45F 3/04* | (2006.01) |

(52) U.S. Cl.
CPC ............ *A01K 1/029* (2013.01); *A01K 1/0254* (2013.01); *A45C 7/0068* (2013.01); *A45F 3/04* (2013.01); *A45F 2003/045* (2013.01)

(58) Field of Classification Search
CPC .... A47D 13/02; A47D 13/025; A01K 1/0254; A01K 1/029
See application file for complete search history.

(56) References Cited

U.S. PATENT DOCUMENTS

| | | |
|---|---|---|
| D57,526 S | 4/1921 | Hunt |
| D111,138 S | 9/1938 | Firle |
| D132,469 S | 5/1942 | Murph |
| (Continued) | | |

FOREIGN PATENT DOCUMENTS

| | | |
|---|---|---|
| CA | 187374 S | 9/2020 |
| CA | 197855 S | 2/2022 |
| (Continued) | | |

OTHER PUBLICATIONS

Youtube, "K9 Sport Sack Rover Dog Backpack Carrier Review and Testing", Posted by "Top Dog Tips" on Sep. 8, 2019. (https://www.youtube.com/watch?v=3ISHSi09L5M) (Year: 2019).
(Continued)

*Primary Examiner* — Monica L Perry
(74) *Attorney, Agent, or Firm* — TraskBritt

(57) ABSTRACT

A pet carrying backpack is provided and includes a backpack body having a bottom panel, a front panel, a rear panel, a right-side panel, and a left-side panel that collectively form an interior compartment. The backpack body also has a top portion with a collar that forms an opening through which a head of an animal disposed within the interior may protrude. The collar may be stretchable. Paw holes are disposed on a front of the backpack body which accommodate paws or legs of the animal. Shoulder straps are disposed on and extend from the front panel. A pet carrying platform is disposed on or within the bottom panel. The pet carrying platform includes a frame member and a pad member.

20 Claims, 19 Drawing Sheets

Related U.S. Application Data continuation of application No. 15/821,539, filed on Nov. 22, 2017, now Pat. No. 10,617,096.

(60) Provisional application No. 62/427,688, filed on Nov. 29, 2016, provisional application No. 62/426,137, filed on Nov. 23, 2016.

(56) References Cited

U.S. PATENT DOCUMENTS

| | | |
|---|---|---|
| 2,407,787 A | 9/1946 | Kernahan |
| 3,019,952 A | 2/1962 | Forrest |
| 3,481,517 A | 12/1969 | Aukerman |
| D220,414 S | 4/1971 | Marshall |
| 4,018,369 A | 4/1977 | Jaeger |
| 4,096,978 A | 6/1978 | Noice |
| 4,194,656 A | 3/1980 | Zufich |
| 4,318,502 A | 3/1982 | Lowe et al. |
| 4,434,920 A | 3/1984 | Moore |
| 4,884,731 A | 12/1989 | Sibley |
| 4,923,104 A | 5/1990 | Rice et al. |
| 4,941,603 A | 7/1990 | Creamer et al. |
| D331,660 S | 12/1992 | Souhrada et al. |
| 5,176,102 A | 1/1993 | Tracy |
| 5,184,762 A | 2/1993 | Nevitt |
| D333,565 S | 3/1993 | Imbert |
| D334,253 S | 3/1993 | Balzarini |
| 5,193,486 A | 3/1993 | Kitchens |
| 5,246,152 A | 9/1993 | Dotseth |
| D340,354 S | 10/1993 | Wrath |
| 5,292,043 A | 3/1994 | McHale |
| 5,297,835 A | 3/1994 | Wengler |
| 5,419,281 A | 5/1995 | Williams et al. |
| 5,467,907 A | 11/1995 | Celik |
| D370,090 S | 5/1996 | Coggins |
| 5,644,902 A | 7/1997 | Kemp |
| D383,305 S | 9/1997 | Holstrom |
| 5,662,339 A | 9/1997 | Svendsen et al. |
| D392,798 S | 3/1998 | Gelb |
| 5,730,347 A | 3/1998 | Finot |
| 5,887,772 A | 3/1999 | Dooley |
| 5,934,527 A | 8/1999 | Von Neumann |
| 5,964,470 A | 10/1999 | Syendsen et al. |
| D418,972 S | 1/2000 | Gold |
| 6,202,910 B1 | 3/2001 | Swetish |
| D460,614 S | 7/2002 | Reimers et al. |
| 6,481,606 B2 | 11/2002 | Pickett |
| D472,047 S | 3/2003 | Vazquez |
| D480,843 S | 10/2003 | Sullivan |
| 6,637,367 B1 | 10/2003 | Dost et al. |
| 6,701,871 B1 | 3/2004 | Johnson |
| D552,848 S | 10/2007 | Ellerby et al. |
| D553,350 S | 10/2007 | Dvorak |
| D554,853 S | 11/2007 | Bihn |
| 7,370,608 B1 | 5/2008 | Friedman |
| D607,640 S | 1/2010 | Emile |
| D615,757 S | 5/2010 | Kostner |
| D616,611 S | 5/2010 | Lu |
| D630,427 S | 1/2011 | McGuire |
| 7,918,192 B1 | 4/2011 | Digh et al. |
| D650,576 S | 12/2011 | Bertken |
| D664,765 S | 8/2012 | Saia |
| D683,537 S | 6/2013 | Bandru |
| D692,654 S | 11/2013 | Irwin et al. |
| D693,569 S | 11/2013 | Lehan |
| D699,940 S | 2/2014 | Robert |
| D699,941 S | 2/2014 | Robert |
| D710,085 S | 8/2014 | Szewczyk |
| 9,044,080 B2 | 6/2015 | Ashenafi |
| D734,942 S | 7/2015 | Robinson et al. |
| D737,046 S | 8/2015 | Robert |
| 9,101,199 B1 | 8/2015 | Harry et al. |
| D737,568 S | 9/2015 | Robert |
| D739,653 S | 9/2015 | Majeau et al. |
| D745,777 S | 12/2015 | Zwetzig et al. |
| D758,715 S | 6/2016 | Daniel et al. |
| D764,873 S | 8/2016 | Collie |
| D771,947 S | 11/2016 | Tong |
| D778,051 S | 2/2017 | Johnson |
| D778,595 S | 2/2017 | Zurowski |
| D779,823 S | 2/2017 | Barenbrug |
| D780,454 S | 3/2017 | Zwetzig et al. |
| D784,685 S | 4/2017 | Newson |
| D787,815 S | 5/2017 | Davison |
| D796,187 S | 9/2017 | Bogue |
| D798,043 S | 9/2017 | Sassi |
| 9,756,920 B2 | 9/2017 | Spears |
| D818,262 S | 5/2018 | Schofield |
| D819,328 S | 6/2018 | Muhlenkamp, IV |
| D822,378 S | 7/2018 | Franek |
| D824,660 S | 8/2018 | Ross |
| D828,112 S | 9/2018 | Furneaux et al. |
| D829,435 S | 10/2018 | Viger et al. |
| D849,399 S | 5/2019 | Christophe |
| 10,321,661 B2 | 6/2019 | Kath |
| D852,492 S | 7/2019 | Anderson |
| D856,661 S | 8/2019 | Lee |
| D858,977 S | 9/2019 | Owens |
| D876,081 S | 2/2020 | Dumas |
| D876,826 S | 3/2020 | Watson et al. |
| D878,036 S | 3/2020 | Watson et al. |
| D880,952 S | 4/2020 | Mitchell et al. |
| 10,617,096 B2 | 4/2020 | Watson et al. |
| D885,690 S | 5/2020 | Han et al. |
| D890,515 S | 7/2020 | Oviedo Polanco |
| D893,811 S | 8/2020 | Wu |
| 10,799,003 B2 | 10/2020 | Bradley et al. |
| D904,756 S | 12/2020 | Lu |
| D908,975 S | 1/2021 | Watson |
| D909,049 S | 2/2021 | Watson |
| D910,243 S | 2/2021 | Watson |
| 10,952,522 B2 | 3/2021 | D'Alessandro |
| D915,762 S | 4/2021 | Li |
| D924,559 S | 7/2021 | Li |
| D931,600 S | 9/2021 | Huang |
| D942,142 S | 2/2022 | Mandos |
| 11,272,685 B2 | 3/2022 | Watson et al. |
| D970,881 S | 11/2022 | Watson |
| D970,882 S | 11/2022 | Watson |
| 11,540,487 B2 | 1/2023 | Watson |
| D979,225 S | 2/2023 | Watson |
| D982,309 S | 4/2023 | Watson |
| 2002/0074372 A1 | 6/2002 | Pickett |
| 2002/0108982 A1 | 8/2002 | Mydans |
| 2002/0124808 A1 | 9/2002 | Zampelli et al. |
| 2003/0127060 A1 | 7/2003 | Yeung |
| 2003/0205601 A1 | 11/2003 | Kilduff |
| 2005/0045674 A1 | 3/2005 | Rehbein |
| 2006/0037562 A1 | 2/2006 | Woerner |
| 2006/0213944 A1 | 9/2006 | Dieter |
| 2007/0012261 A1 | 1/2007 | Altieri |
| 2007/0017947 A1 | 1/2007 | Fenton et al. |
| 2007/0169719 A1 | 7/2007 | Chang |
| 2007/0278263 A1 | 12/2007 | Zak et al. |
| 2008/0029565 A1 | 2/2008 | Enriquez |
| 2008/0054040 A1 | 3/2008 | Tanaka |
| 2008/0066689 A1 | 3/2008 | Martz |
| 2008/0116026 A1 | 5/2008 | Bass et al. |
| 2008/0149673 A1 | 6/2008 | Slater |
| 2008/0156275 A1 | 7/2008 | Lam |
| 2008/0216764 A1 | 9/2008 | Porter |
| 2008/0277435 A1 | 11/2008 | Jones |
| 2009/0026241 A1 | 1/2009 | Leyendecker |
| 2009/0127299 A1 | 5/2009 | Jamlang |
| 2010/0199927 A1 | 8/2010 | Cigard et al. |
| 2011/0083933 A1 | 4/2011 | Engel |
| 2011/0089188 A1 | 4/2011 | Askinasi |
| 2011/0278337 A1 | 11/2011 | Chiu |
| 2011/0278338 A1 | 11/2011 | Darnell, II et al. |
| 2011/0284608 A1 | 11/2011 | Staudecker et al. |
| 2012/0006865 A1 | 1/2012 | Su |
| 2013/0177264 A1 | 7/2013 | Utterback |
| 2013/0221051 A1 | 8/2013 | Hairston et al. |
| 2013/0277407 A1 | 10/2013 | Murdoch et al. |

(56) References Cited

U.S. PATENT DOCUMENTS

| | | |
|---|---|---|
| 2014/0060453 A1 | 3/2014 | Shewfelt |
| 2015/0374139 A1 | 12/2015 | Salazar et al. |
| 2016/0015003 A1 | 1/2016 | Watson et al. |
| 2016/0100673 A1 | 4/2016 | Demskey |
| 2016/0227730 A1 | 8/2016 | Rivera |
| 2017/0172102 A1 | 6/2017 | Rivera |
| 2017/0215385 A1 | 8/2017 | Hansen et al. |
| 2018/0139921 A1 | 5/2018 | Kath |
| 2018/0139922 A1 | 5/2018 | Watson et al. |
| 2018/0146756 A1 | 5/2018 | Meservey |
| 2018/0154203 A1 | 6/2018 | Schromm |
| 2018/0228120 A1 | 8/2018 | Laicheng |
| 2019/0254400 A1 | 8/2019 | Challa |
| 2019/0281962 A1 | 9/2019 | Edgel |
| 2020/0029533 A1 | 1/2020 | Badr |
| 2020/0060222 A1 | 2/2020 | Watson |
| 2020/0100469 A1 | 4/2020 | Elam |
| 2020/0128943 A1 | 4/2020 | D'Alessandro |
| 2020/0229580 A1 | 7/2020 | Cigard et al. |
| 2020/0352294 A1 | 11/2020 | Davis |
| 2022/0015328 A1 | 1/2022 | Ross |
| 2022/0061262 A1 | 3/2022 | Watson |
| 2022/0061263 A1 | 3/2022 | Watson |
| 2023/0172344 A1 | 6/2023 | Armitage |
| 2023/0232783 A1 | 7/2023 | Wang |

FOREIGN PATENT DOCUMENTS

| | | |
|---|---|---|
| CN | 201005216 Y | 1/2008 |
| CN | 202535860 U | 11/2012 |
| CN | 203353366 U | 12/2013 |
| CN | 203493023 U | 3/2014 |
| CN | 303221063 S | 5/2015 |
| CN | 303342928 S | 8/2015 |
| CN | 204733728 | 11/2015 |
| CN | 304021795 S | 2/2017 |
| CN | 206150107 U | 5/2017 |
| CN | 304922920 S | 12/2018 |
| CN | 305122160 S | 4/2019 |
| CN | 209268299 U | 8/2019 |
| CN | 306365217 S | 3/2021 |
| DE | 4040792 A1 | 6/1992 |
| DE | 202011102300 U1 | 1/2012 |
| DE | 202014007394 | 4/2015 |
| EM | 000042999-0004 | 10/2003 |
| EM | 006395372-0001 | 4/2019 |
| EM | 006395372-0002 | 6/2019 |
| FR | 2668044 | 4/1992 |
| GB | 2436735 A | 10/2007 |
| GB | 6016752 | 8/2017 |
| GB | 9006395372-0002 | 4/2019 |
| GB | 6128720 | 4/2021 |
| IN | 298348-0001 | 6/2019 |
| JP | 03-167159 A | 7/1991 |
| JP | 05-046264 U | 6/1993 |
| JP | 2000-287574 A | 10/2000 |
| JP | 3167159 U | 7/2011 |
| JP | 1609184 S | 7/2018 |
| JP | 1621362 S | 1/2019 |
| KR | 20-0335245 Y1 | 12/2003 |
| KR | 30-0640-7780000 | 4/2012 |
| KR | 10-1525981 B1 | 6/2015 |
| KR | 10-1535826 B1 | 7/2015 |
| KR | 30-0823841 | 11/2015 |
| KR | 10-2019-0056722 A | 5/2019 |
| KR | 30-1051144 | 3/2020 |
| KR | 30-1136355 | 11/2021 |
| RU | 00084313 | 2/2013 |
| RU | 127653 U1 | 5/2013 |
| RU | 00127653 | 9/2021 |
| SG | 20141329F-0001 | 11/2014 |
| TW | M444711 U | 1/2013 |
| TW | 514722 U | 1/2016 |
| TW | M514722 U | 1/2016 |
| TW | D180162 S | 12/2016 |
| TW | D182034 S | 4/2017 |
| TW | D190435 S | 5/2018 |
| TW | D194326 S | 12/2018 |
| WO | 97/37529 A1 | 10/1997 |
| WO | 2008/153252 A1 | 12/2008 |
| WO | 2016/096150 A1 | 6/2016 |
| WO | 2018/098359 A1 | 5/2018 |
| WO | 2020/041510 A1 | 2/2020 |

OTHER PUBLICATIONS

Ytonet Pet Carrier Backpack, available at amazon.com, earliest date available Nov. 30, 2018 [online], site visited Dec. 9, 2021, Available from the internet URL: https://www.amazon.com/dp/B07FY4561Q?th=1 (Year: 2018).

Amazon, "K9 Sport Sack | Dog Carrier Backpack for Small and Medium Pets . . . ", First review Jan. 4, 2016. (https://www.amazon.com/dp/B07HZ6BVQ4?th=1) (Year: 2016).

Backpack, walmart.com, dale not available [online], site visited Dec. 9, 2021, Available from the internet URL: https://www.walmart.com/ip/Anself-Pet-Backpack-Dog-Cat-Carrier-Double-Zip-Clear-Window-Side-Pockets-Tmvel-Shoulder-Bag-Open-Doors-Comfortable-Travelling-Hiking-Outdoor-Use/397323749.

Bushcraft USA Forums, Mystery Ranch Comparison—Sweet Pea vs. the 3 Day Assault Pack, https://web.archive.org/web/20160926234313/http://bushcraftusa.com:80/forum/threads/mystery-ranch-comparison-sweet-pea-vs-the-3-day-assault-pack.93311/, Sep. 8, 2016, 14 pages.

Chinese Final Office Action for Chinese Application No. 202210155869.8, dated Feb. 27, 2024, 13 pages with translation.

Chinese Second Office Action for Chinese Application No. 202210155869.8, dated Nov. 17, 2023, 22 pages with translation.

Chinese Third Office Action for Application No. 2019800642964 dated Jan. 20, 2023, 15 pages.

Extended European Search Report dated Apr. 7, 2022; in EP Application No. 19851294.9 filed Aug. 21, 2019; 9 pages.

Extended European Search Report issued Jun. 10, 2020; in EP Application No. 17874238.3 filed Nov. 22, 2017, 9 pages.

Gear Lab Reviews, Eagle Creek Deviate 60 Review | Tested by GearLab, https://www.outdoorgearlab.com/reviews/travel/travel-backpack/eagle-creek-deviate-60, (Jun. 8, 2015, 5 pages.

Gear Lab, Deuter Quantum 70+10 Review, https://www.outdoorgearlab.com/reviews/travel/travel-backpack/deuter-quantum-70-plus-10, (Jun. 8, 2015), 5 pages.

Gossamer Gear Mariposa 60 Backpack, available at youtube.com, posted Mar. 29, 2022 [online], site visited Apr. 27, 2022, available from the internet URL: https://www.youtube.com/walch?v=pbzkBVvXAIA (Year: 2022).

Herkey the Cavalier's K9 Sport Sack Adventure 2019, available at youtube.com, posted Apr. 25, 2019 [online], site visited Dec. 9, 2021, Available from the internet URL: https://www.youtube.com/walch?v=wxGILs-DsiE(Year: 2019).

International Search Report for International Application No. PCT/US2022/012588 dated Apr. 22, 2022, 12 pages.

International Search Report for International Application No. PCT/US2017/063130 dated Mar. 12, 2018, 3 pages.

International Search Report for International Application No. PCT/US2019/047562 dated Dec. 4, 2019, 3 pages.

International Search Report for International Application No. PCT/US2021/048299 dated Nov. 29, 2021, 10 pages.

JPO Notification of Lisi of References for JP Design Registration Application No. 2018-020511.

JPO Ref. No. HA13021582, Tokusengai, 1st, vol. 24, p. 175, Jan. 1, 2002, 1 page.

JPO Ref. No. HB08021181, Outside, 9th, vol. 21, p. 150, Sep. 30, 1996, 1 page.

JPO Ref. No. HC14042642, General Catalog, E-Molion, p. 28, JPO documented on Sep. 27, 2002, 1 page.

JPO Ref. No. HC15040837, Adventure Travel, The North Face Catalog Fall & Winier 2003-2004, p. 53, JPO documented on Oct. 24, 2003, 1 page.

JPO Ref. No. HH13021686, S Design Gazette (DE), Nov. 10, 2000, 1 page.

(56) References Cited

OTHER PUBLICATIONS

K9 Sport Sack Air 2, available at k9sportsack.com, earliest customer review dale Feb. 24, 2020 [online], site visited Dec. 9, 2021, Available from the internet URL: https://www.k9sportsack.com/products/air-2 (Year: 2020).
K9 Sport Sack Air Trainer, available at petco.com, date not available [online], site visited Dec. 9, 2021, Available from the internet URL: https://www.petco.com/shop/en/petcostore/product/k9-sport-sack-air-trainer-green-backpack-pet-carrier-12-1-x-11-w-x-22-h-3161467?
K9 Sport Sack Evolution, available at youtube.com, posted May 22, 2020 [online], site visited Dec. 9, 2021, Available from the internet URL: https://www.youtube.com/watch?v=zGWK70RMVQM (Year: 2020).
K9 Sport Sack Knavigate, available at k9sportsack.com, earliest customer review date Dec. 15, 2020 [online], site visited Dec. 9, 2021, Available from the internet URL: https://www.k9sportsack.com/products/k9-sport-sack-knavigate (Year: 2020).
K9 Sport Sack Post, available at facebook.com, posted Jun. 1, 2018 [online], site visited Dec. 9, 2021, Available from the internet URL: https://www.facebook.com/k9sportsackusa/photos/a.1606811192922964/2095610264043052/?type=3 (Year: 2018).
K9 Sport Sack Trainer, available at amazon.com, earliest customer question date Dec. 1, 2019 [online], site visited Dec. 9, 2021, Available from the internet URL: https://www.amazon.com/K9-Sport-Sack-Adjustable-Veterinarian/dp/B07XYK9N3G/?th=1 (Year: 2019).
K9 Sport Sack Walk-On, posted at amazon.com, first available Aug. 18, 2020, retrieved on May 10, 2023, online, https://www.amazon.com/K9-Sport-Sack-Carrier-Backpack/dp/B09S5RXPLG (Year: 2020).
K9 Sport Sack, posted ar www.bonesps.com, no posting date available, online. URL: https://www.bonesps.com/collections/vendors?q=K9%20Sport%20Sack (Year: 2018).
K9 Sport Sack, The World's Most Unique Dog Bag Carrier K9 Sport Sack 2, , https://web.archive.org/web/20150521040634/http://www.k9sportsack.com:80/, (Jan. 7, 2012), 3 pages.
K9 Sport Sack: Because Dogs Just Wanna to Have Fun! posted at missmollysays.com, posted on Feb. 26, 2017, online, URL: https://missmollysavs.com/k9-soort-sack-because-dogs-just-wanna-have-fun/ (Year: 2017).
K9 Sport Sack: Unique Dog Transportation Bag, available at www.kickstarter.com, posted Apr. 26, 2013 [online], available from the Internet URL: https://www.kickstarter.com/projects/1034052737/k9-sport-sack-unique-dog-transportation-bag?ref=discovery&term=k9%20sport%20sack.
K9 Sport Sack: Unique Dog Transportation Bag, https://www.kickstarter.com/projects/1034052737/k9-sport-sack-unique-dog-transportation-bag, (Apr. 26, 2013, 10 pages.
Knavigate, posted at k9sportsack.com, first available Dec. 15, 2020, retrieved on May 10, 2023, online, https://www.k9sportsack.com/products/k9-sport-sack-knavigate?variant=32040903180346 (Year: 2020).
Kurgo G-Train Backpack, available at chewy.com, earliest customer review date May 14, 2019 [online], site visited Dec. 9, 2021, Available from the internet URL: https://www.chewy.com/kurgo-g-train-airline-approved-dog/dp/190589? (Year: 2019).
Osprey Aether 55 Pack, available at moosejaw.com, earliest customer review date Apr. 2021 [online], site visited Apr. 27, 2022, available from the internet URL: https://www.moosejaw.com/producl/osprey-aether-55-pack_10499354? (Year: 2021).
Outward Hound Carrier, available at amazon.com, earliest date available Apr. 30, 2012 [online], site visited Dec. 9, 2021, Available from the internet URL: https://www.amazon.com/Outward- Hound-Pooch Pouch-Carrier-Backpack/dp/80081 XIJ9M? (Year: 2012).
Ozark Trail 45 ltr Backpacking Backpack, available at walmart.com, earliest customer review date Nov. 17, 2019 [online], site visited Apr. 27, 2022, available from the internet URL: https://www.walmart.com/ip/Ozark-Trail-45-Itr-Backpacking-Backpack-Gray/565060930 (Year: 2019).
PawRoll Dog Carrier Backpack, available at pawroll.com, earliest customer review date Jan. 26, 2018 [online], site visited Dec. 9, 2021, Available from the internet URL: https://pawroll.com/products/pawroll-dog-backpack-carrier? (Year: 2018).
Pets Carrier Backpack, available at nxills.com, date not available [online], site visited Dec. 9, 2021, Available from the internet URL: https://www.nxills.com/index.php?main_page=product_info&products_id =794974.
Rover 2 | Big Dog Carrier & Backpacking Pack, available at k9sportsack.com, earliest customer review date Feb. 3, 2021 [online], site visited Apr. 27, 2022, available from the internet URL: https://www.k9sportsack.com/products/rover-2-dog-carrier-backpacking-pack (Year: 2021).
Ruffit Dog Carrier, available at amazon.com, earliest customer review Dec. 12, 2017 [online], site visited Apr. 20, 2022.
Ruffit, First Front Facing Dog Carrier, https://web.archive.org/web/20161006020255/http:/ruffitusa.com/, (Mar. 12, 2015), 4 pages.
The All New Knavigate, available at youtube.com, posted Dec. 1, 2020 [online], site visited Dec. 9, 2021, Available from the internet URL: https://www.youtube.com/watch?v=hfK0ryG2z4o (Year: 2020).
Tirrinia Large Pet Backpack, available at amazon.com, earliest date available Nov. 30, 2018 [online], site visited Dec. 9, 2021, Available from the internet URL: https://www.amazon.com/gp/producl/B0797DGZ38/?th=1 (Year: 2018).
Tough Traveler, Dog Perch Backpack, Gear Lab Reviews, Eagle Creek Deviate 60 Review | Tested by GearLab, https://web.archive.org/web/20160315204426/http://www.toughtraveler.com/dogbags.asp, (Jun. 8, 2015, 5 pages, (Oct. 28, 2004), 5 pages.
Walk-on with harness & storage, posted atk9sportsack.com, first available Feb. 14, 2022, retrieved on May 10, 2023, online, https://www.k9sportsack.com/collections/dog-carriers/products/walk-on-with-harness-storage?variant=39529235316794 (Year: 2022).
WLDOCA Dog Carrier Backpack, available at amazon.com, earliest date available Mar. 14, 2019 [online], site visited Dec. 9, 2021, Available from the internet URL: https://www.amazon.com/WLDOCA-Carrier-Backpack-Adjustable-Motorcycle/dp/B08KVXPTHR?th=1 (Year: 2019).
WOYYHO Pet Dog Carrier Backpack, available at amazon.com, earliest date available Oct. 17, 2020 [online], site visited Dec. 9, 2021, Available from the internet URL: https://www.amazon.com/dp/B08L7RFYXG?tag=up grapoint-20&1inkCode=ogi&th=1 (Year: 2020).
European Extended Search Report and Opinion for European Application No. 21862942.6, dated Oct. 9, 2024, 11 pages.
European Extended Search Report and Opinion for European Application No. 22740179.1, dated Nov. 13, 2024, 13 pages.
Canadian Requisition by the Examiner for Canadian Application No. 3,044,852, dated Apr. 24, 2024, 7 pages.
Canadian Requisition by the Examiner for Canadian Application No. 3,193,311, dated Jun. 19, 2024, 3 pages.
European Extended Search Report and Opinion for European Application No. 23196684.7, dated Jun. 10, 2024, 8 pages.
International Search Report for International Application No. PCT/US19/47562, mailed Dec. 4, 2019, 3 pages.
International Written Opinion for International Application No. PCT/US19/47562, mailed Dec. 4, 2019, 7 pages.
International Written Opinion for International Application No. PCT/US2017/063130, mailed Mar. 12, 2018, 10 pages.
International Written Opinion for International Application No. PCT/US2021/048299, mailed Nov. 29, 2021, 5 pages.
International Written Opinion for International Application No. PCT/US22/12588, mailed Apr. 22, 2022, 6 pages.
Ozark Trail 45 ltr Backpacking Backpack, available at walmart.com, earliest customer review date Nov. 17, 2019 [online], site visited Apr. 27, 2022, available from the internet URL: https://www.walmart.com/ip/Ozark-Trail-45-Itr-Backpacking-Backpack-Gray/565060930 (Year: 2019).
Packable Daypacks; https://www.youtube.com/watch?v=AvmKwaUaiUg ; Pack Hacker; Mar. 5, 2020.
TIPO's Examination & Search Report and English translation document issued for Taiwan Design. Registration Application No. 108301176 and completed on Aug. 15, 2019, in 8 pages.

PET CARRYING BACKPACK

CROSS-REFERENCE TO RELATED APPLICATIONS

This application is a continuation of U.S. patent application Ser. No. 17/694,431, filed Mar. 14, 2022, which is a continuation of and claims priority to U.S. patent application Ser. No. 16/841,640, filed Apr. 6, 2020, now U.S. Pat. No. 11,272,685, issued Mar. 15, 2022, which is a continuation of and claims priority to U.S. patent application Ser. No. 15/821,539, filed on Nov. 22, 2017, now U.S. Pat. No. 10,617,096, issued Apr. 14, 2020, which claims priority to and the benefit of U.S. Provisional Application No. 62/426,137, which was filed on Nov. 23, 2016 and to U.S. Provisional Application No. 62/427,688, which was filed on Nov. 29, 2016, the contents of each of which is incorporated by reference.

BACKGROUND

Many people enjoy keeping pets for the companionship, help, and/or friendship that they provide. Pets, of course, require substantial time and care from their owners to ensure that they are well cared for. Sometimes, pet owners would like to travel, hike, or participate in other activities which their pets are not capable of due to the pet's size, age, or various health issues. Many pet owners also prefer not to leave their pets in the care of friends or commercial pet care facilities while participating in such activities. Accordingly, such pet owners are in need of a solution that allows them to participate in activities they find enjoyable while being able to bring along their pet companions that may not otherwise be capable of joining with them.

BRIEF SUMMARY

Accordingly, a pet carrying backpack is provided that satisfies the need for pet owners to bring their pets with them on various activities. According to one aspect of the disclosed embodiments, a pet carrying backpack includes a backpack body having a bottom panel, a front panel, a rear panel, a right-side panel, and a left-side panel that collectively form an interior compartment. The backpack body also has a top portion with a collar that forms an opening through which a head of an animal disposed within the interior may protrude. The collar may be stretchable. Paw holes are disposed on a front of the backpack body which accommodate paws or legs of the animal. Shoulder straps are disposed on and extend from the front panel. A pet carrying platform is disposed on or within the bottom panel. The pet carrying platform includes a frame member and a pad member.

In some embodiments, the pet carrying backpack also includes contouring straps that are configured to shape the interior compartment of the backpack. The contouring straps may be disposed on at least one of the back panel and the side panel. The pet carrying backpack may further have a vertical zipper disposed in the back panel. The zipper facilitates ingress and egress to and from the interior compartment. One of the contouring straps may be disposed to cross the vertical zipper.

The right-side panel and the left-side panel may comprise vents to facilitate airflow within the interior compartment. In some embodiments, the vents may comprise a webbed material. The vents may extend from the top portion to the bottom panel.

In further embodiments, the pet carrying backpack collar includes an adjustable strap. The top portion of the backpack may comprise a stretchable portion above the left-side panel and the right-side panel.

In some instances, the pet carrying platform is adjustable to raise and lower to effectively change the size of the interior. At least two zippers may release extra material when unzipped to lower the pet carrying platform. The at least two zippers extend around the backpack body. The pet carrying backpack may also have a lower compartment disposed below the backpack body. The lower compartment may be spaced from the backpack body to accommodate the lowering of the pet carrying platform via the at least two zippers.

In other exemplary embodiments, a pet carrying backpack includes a backpack body defining an interior, shoulder straps connected to the backpack body, and an adjustable pet platform that raises and lowers to effectively change the size of the interior. The pet carrying backpack may use at least two zippers that release extra material when unzipped to lower the pet carrying platform. The at least two zippers extend around the backpack body.

The pet carrying backpack may also have a lower compartment disposed below the backpack body. The lower compartment may be spaced from the backpack body to accommodate the lowering of the pet carrying platform via the at least two zippers.

The backpack body may include a bottom panel, a front panel, a rear panel, a right-side panel, and a left-side panel that collectively form an interior compartment. The backpack body also has a top portion with a collar forming an opening which allows a head of an animal disposed within the interior to protrude. The collar may be stretchable. Paw holes are disposed on a front of the backpack body and are configured to accommodate paws or legs of the animal.

In some embodiments, the pet carrying backpack has waist straps attached to the backpack body that are configured to extend around a user's waist. It may also include a vertical zipper extending along a rear side of the backpack body, the vertical zipper facilitating ingress and egress to and from the interior.

In some embodiments, the pet carrying backpack also has vents disposed in side portions of the backpack body. The vents may be formed from a webbed material. The pet carrying backpack may have pockets that at least partially overlap the vents. The pockets may be at least partially formed from a mesh material.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 1:
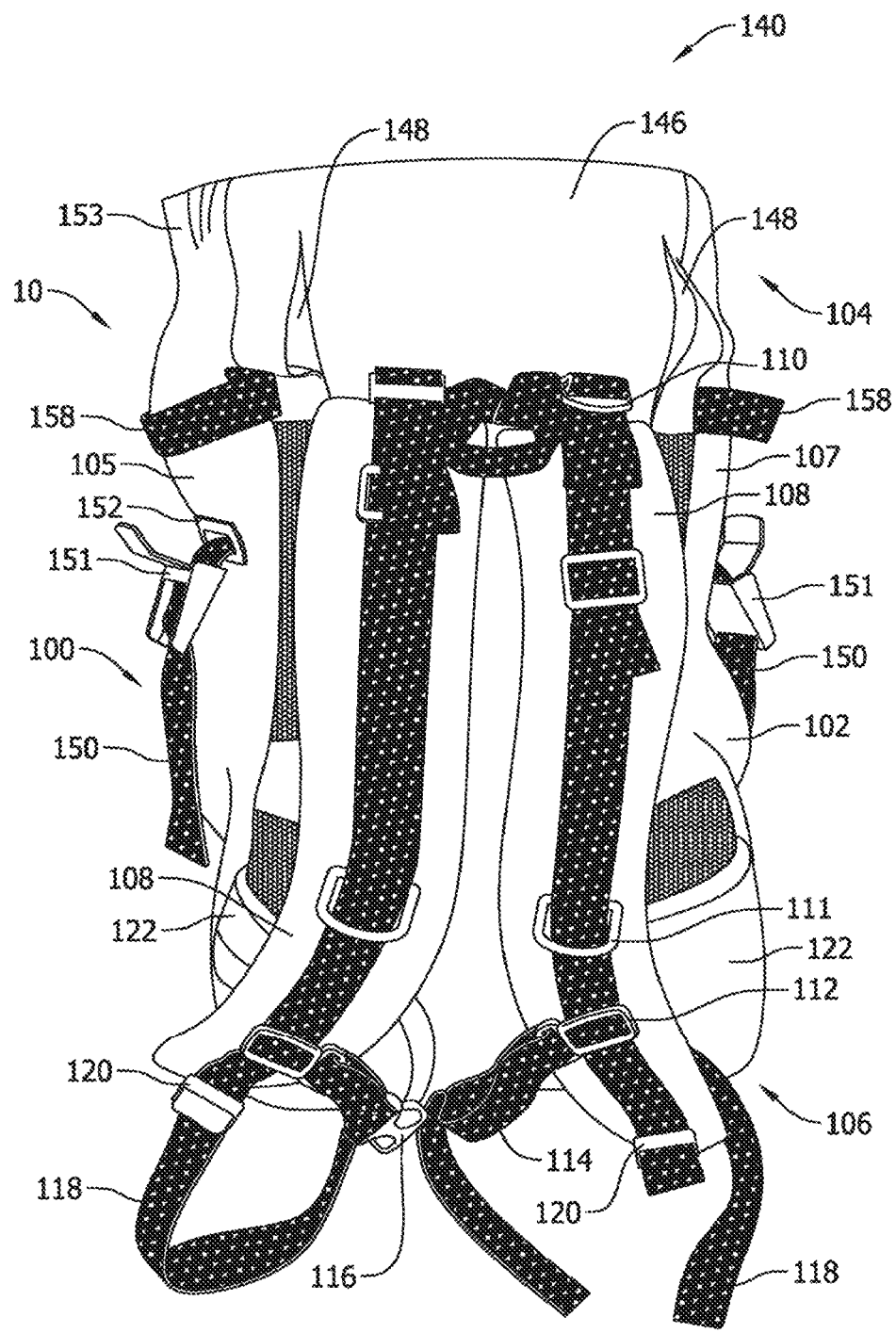
FIG. 1 shows a front view pet carrying backpack according to one embodiment.

FIG. 1 shows a front view pet carrying backpack according to one embodiment. In FIG. 1, a pet carrying backpack 10 is comprised generally of a backpack body 100 formed to carry items therein. The backpack body 100 comprises a front panel 102, a back panel 103, side panels 105, 107, and a top portion 104. The panels 102, 103, 105, 107 and top portion 104 of the backpack body 100 may be formed separately and may be attached to one another during the manufacturing process, such as by sewing, by adhesives, or by fabric welding. In other embodiments, one or more of the panels 102, 103, 105, 107 and/or top portion 104 of the backpack body 100 may be formed as a single piece. The backpack body 100 may be formed of any suitable material including natural or synthetic materials as now known or later developed. In some embodiments, the backpack body 100 may include a plastic frame, a metal frame, or a combination thereof, while in other embodiments the backpack body 100 is a frameless body. The frame may be an internal or an external frame.

Shoulder straps 108 may be connected to the front panel 102. These may be fastened to the front panel 102 in any suitable manner as known in the art. The shoulder straps 108 may comprise padded material such as foam to provide comfort to the user. In some instances, the straps 108 may include ventilation, such as via holes in the padding and a mesh outer covering. The shoulder straps 108 may optionally be adjustable at a top end thereof. For example, upper cinch straps 110 may be provided at a top end to adjust the fit of the shoulder straps 108. The shoulder straps 108 may further comprise a plastic loop 111 to which various items may be attached as needed by a user. In other embodiments, a fabric loop may be provided instead of the plastic loop 111. For example, a stretchable material may extend from one side of a strap 108 to the other to facilitate attachment of items to the straps 108. The straps 108 may also comprise a sternum strap 114 that includes height adjustment cinches 112. The sternum strap 114 also comprises clips 116 to selectively fasten the sternum strap 114. In other embodiments, other mechanism may be used for height adjustment of the sternum strap 114, such as framed cam surface that extends along the front of the strap and along which a cam follower clip may move.

Shoulder straps 108 may further comprise lower cinch straps 118 with cinches 120 to adjust the strap 108 at a lower end thereof. In some embodiments, the upper cinch straps 110 and the lower cinch straps 118 may comprise a single strap that extends along the entire shoulder strap 108 and is connected to the shoulder strap 108 at various points. In other embodiments, the upper cinch straps 110 are omitted and only the lower cinch straps 118 are provided.

Figure 2:
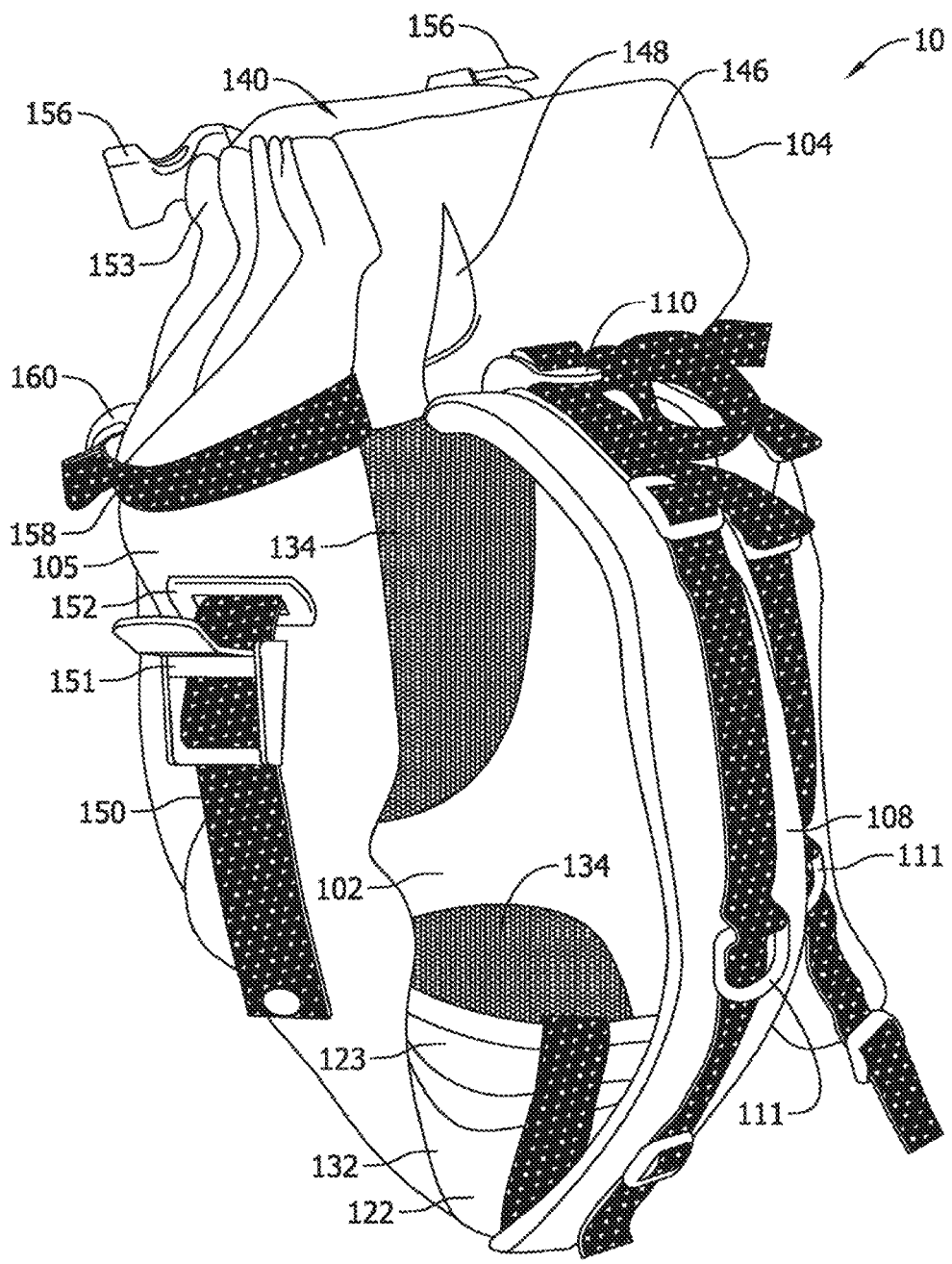
FIG. 2 shows a perspective view of the pet carrying backpack of FIG. 1.

FIG. 2 shows a perspective view of the pet carrying backpack of FIG. 1. As shown in FIGS. 1 and 2, several raised padded support members 134 may be included on the front panel 102. The raised support members 134 provide comfort to the user both via the padding in the members 134 and the air flow created by spacing the front panel 102 from the back of the user while in use.

Figure 3:
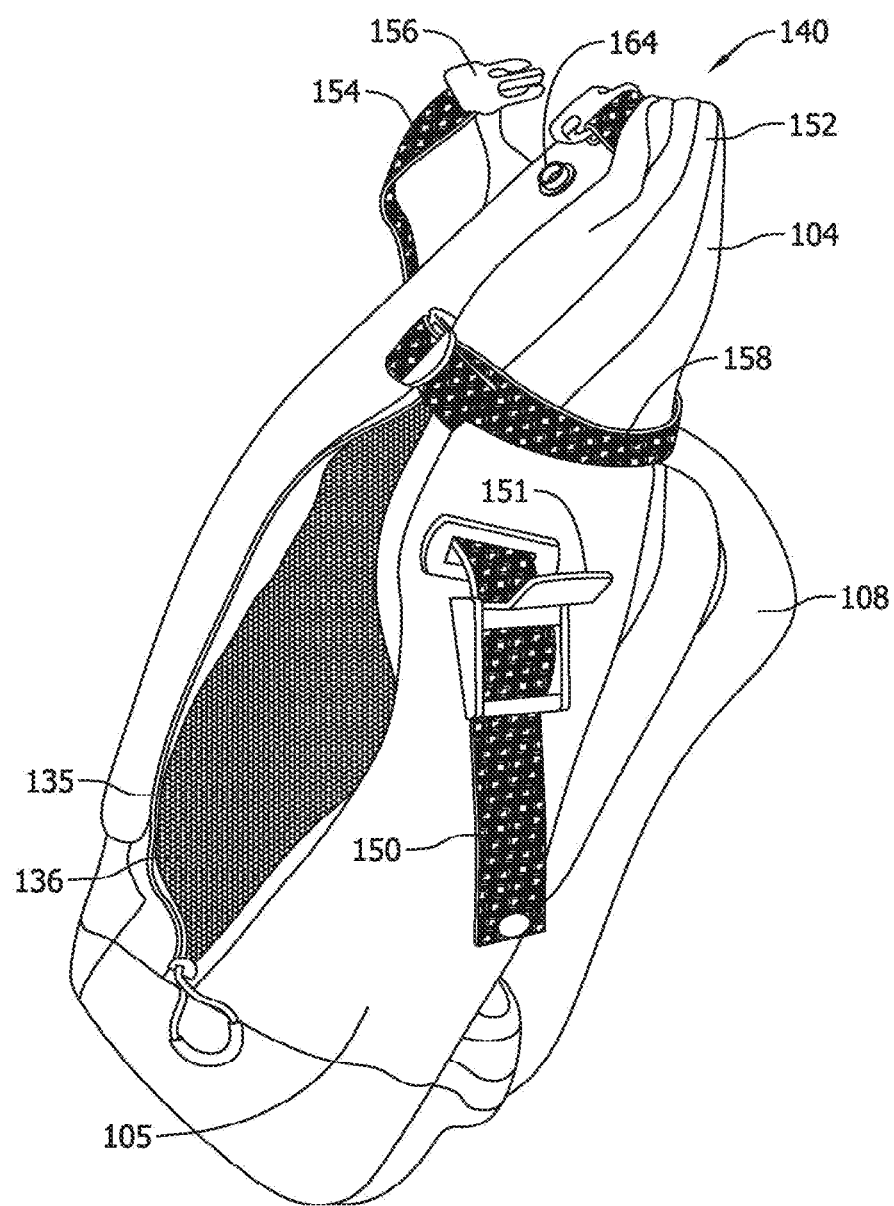
FIG. 3 shows a right-side view of the pet carrying backpack of FIG. 1.
Figure 4:
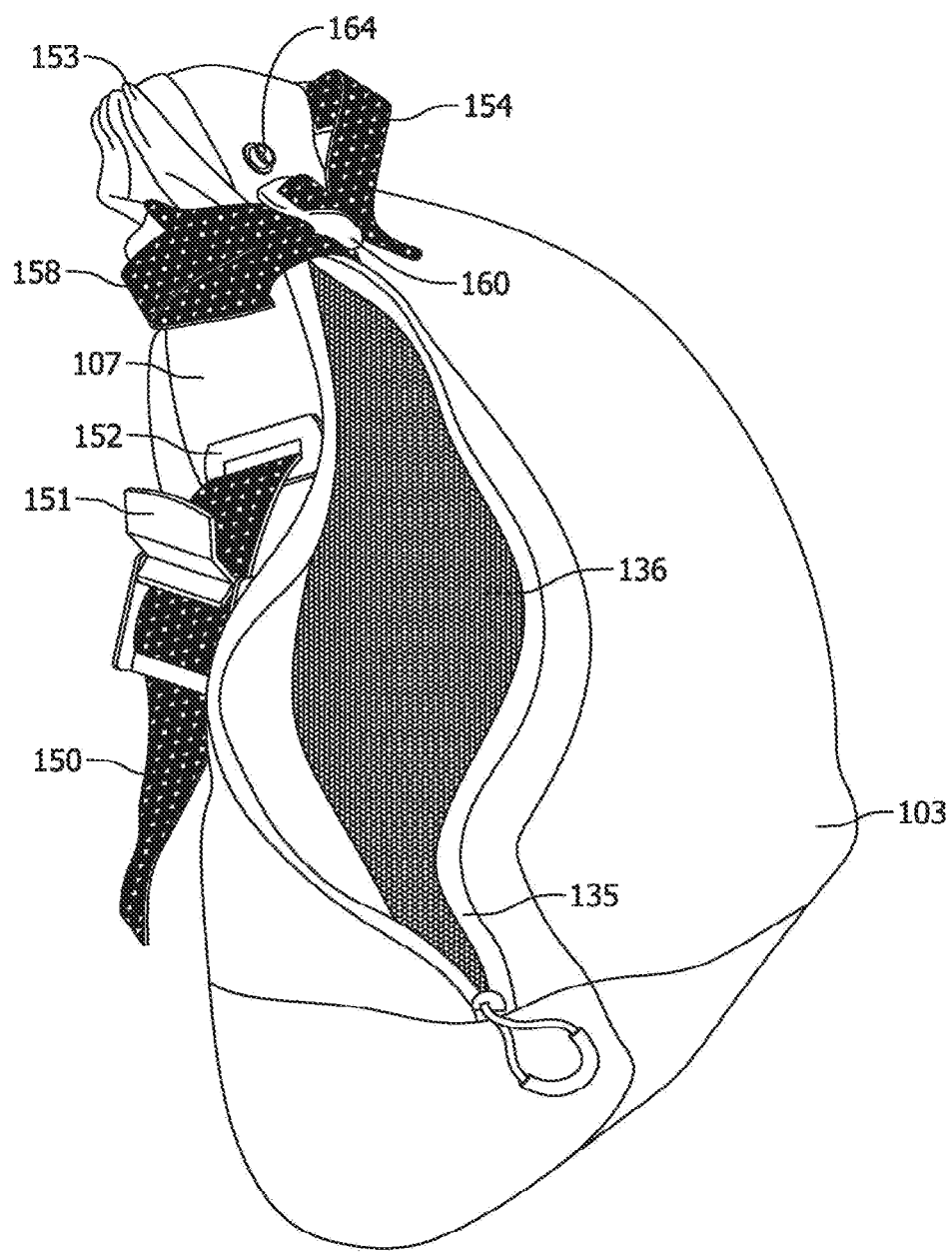
FIG. 4 shows a left-side view of the pet carrying backpack of FIG. 1.

FIG. 3 shows a right-side view of the pet carrying backpack of FIG. 1, and FIG. 4 shows a left side view. As shown in FIGS. 3 and 4, the right and left side panels 105, 107 include a zipper 135 that provides access to a vent 136. The vent 136 may be formed from a mesh material and allows ventilation into the interior of the backpack 10. In some embodiments, the side panels 105, 107 may be formed primarily of the mesh material and the zipper 135 may be omitted.

Figure 5:
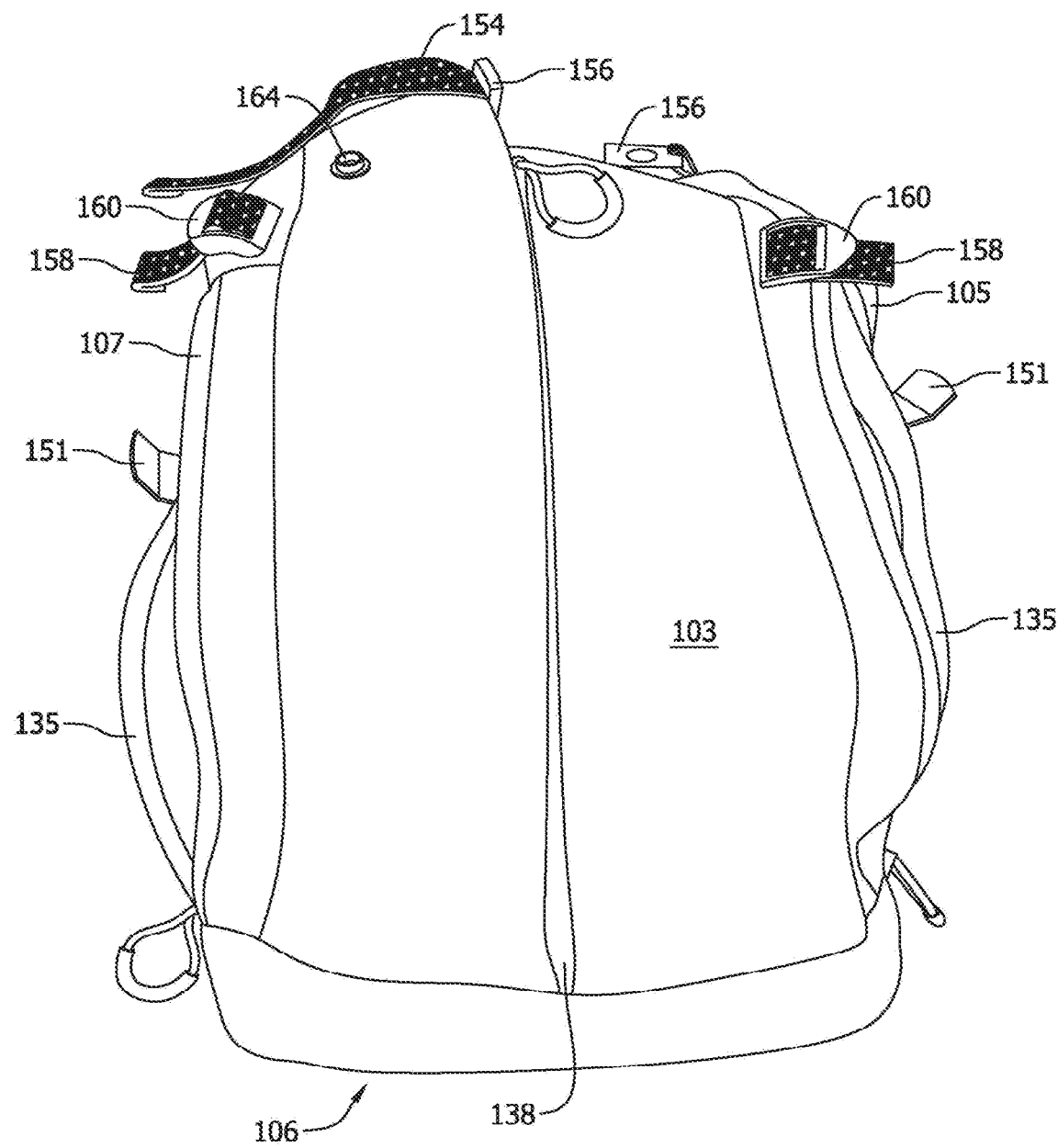
FIG. 5 shows a back view of the pet carrying backpack of FIG. 1.
Figure 6:
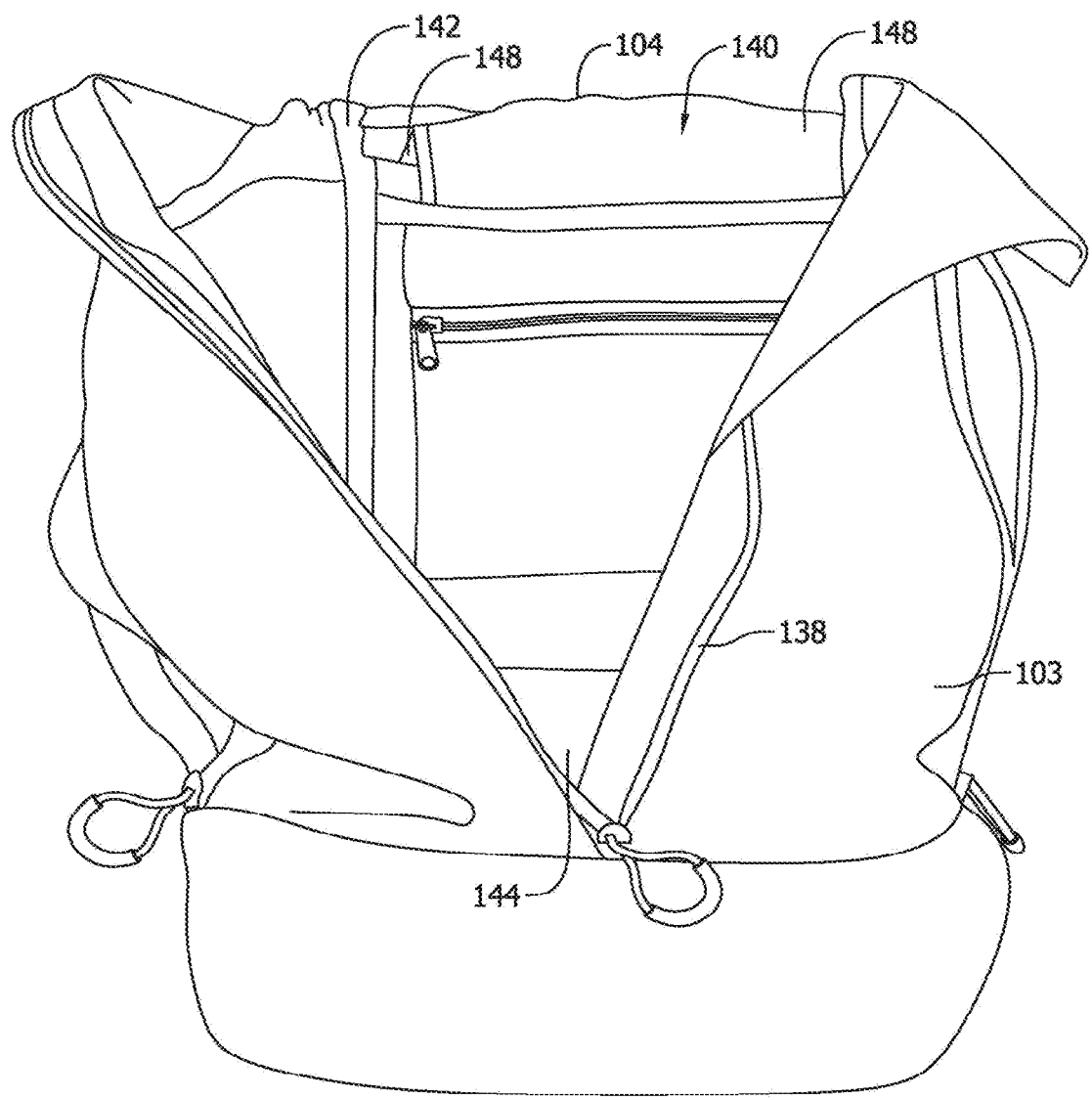
FIG. 6 shows a back view of the pet carrying backpack of FIG. 1 with the back of the backpack opened.
Figure 7:
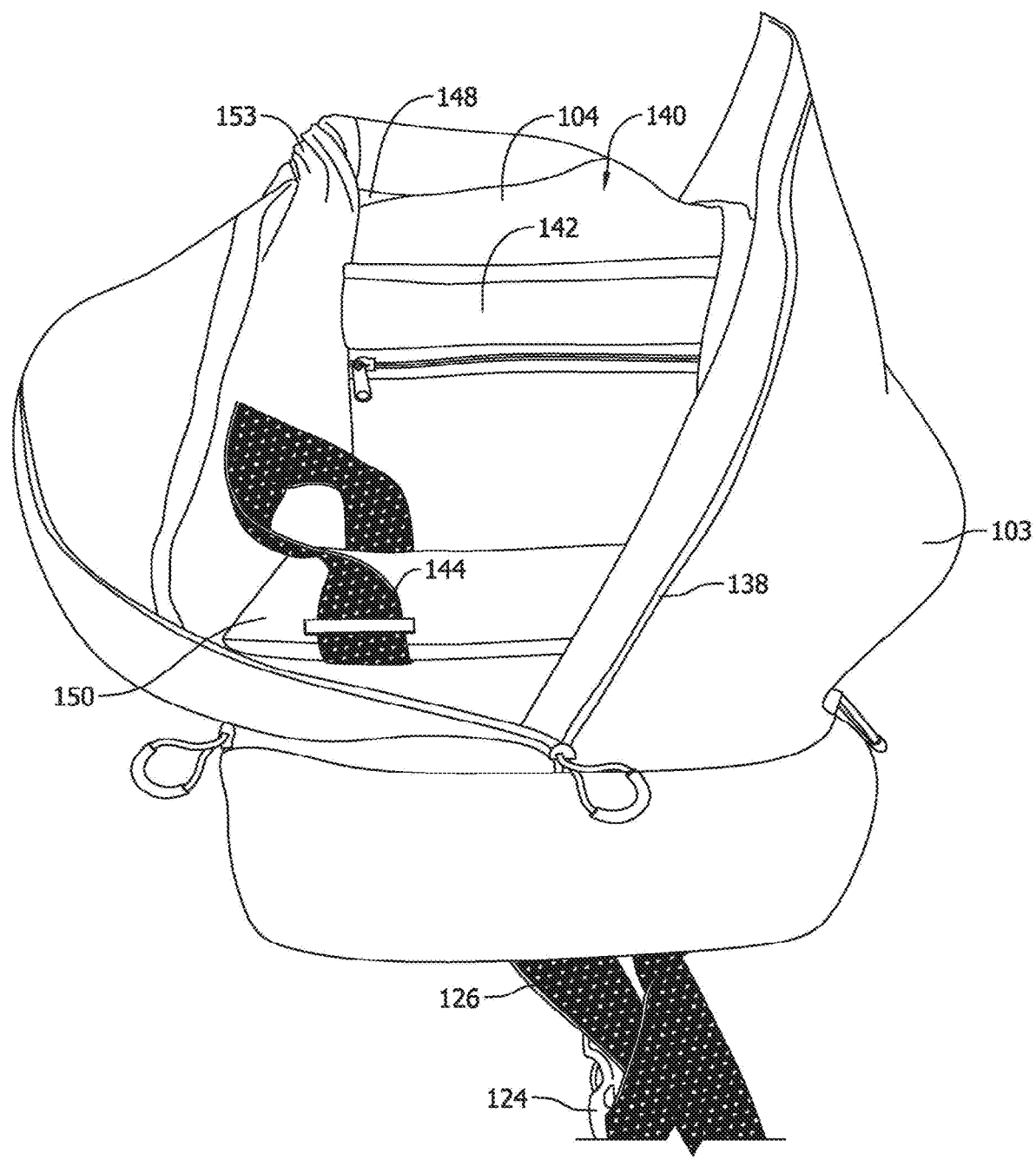
FIG. 7 shows a back view of the pet carrying backpack of FIG. 1 with the back of the backpack opened and a pet platform in a raised position.

FIGS. 5-7 show a back view of the pet carrying backpack of FIG. 1. As shown in FIG. 5, the back panel 103 comprises a zipper 138. In FIG. 6, the zipper 138 is in an open position to provide access to the interior 140 of the backpack 10. Within the interior 140, there may be storage compartments 142 attached to one of the panels 102, 103, 105, 107.

The backpack 10 further comprises a pet platform 144 disposed within the interior 140. The pet platform 144 is a sturdy, padded member that is configured to allow a pet, such as a dog or cat, to sit or stand inside the interior 140 of the backpack. For example, the pet platform 144 may comprise a pad formed from a foam material, and a plastic frame member supporting the pad and providing rigidity to the platform 144. As shown in FIG. 7, the pet platform 144 is configured to raise and lower within the interior 140. In FIG. 7, the platform 144 is in a raised position as compared to the position of the platform 144 shown in FIG. 6. Thus, the platform 144 is configured to move relative to the panels 102, 103, 105, 107. This effectively increases and decreases the size of the interior 140 of the backpack to easily accommodate differently sized pets.

When the pet is placed on the platform 144 within the interior 140 of the backpack 10, the zipper 138 may then be reclosed so that the pet is securely retained within the interior 140. The upper portion 104 is configured to surround the neck or upper body of the pet, so that the head or upper body of the pet extends therethrough. The upper portion 104 includes paw holes 148 to allow the pet's paws to extend out front toward the pet's owner (FIGS. 1 and 2). This may further provide the pet with a sense of security while being carried in the backpack 10.

Figure 11:
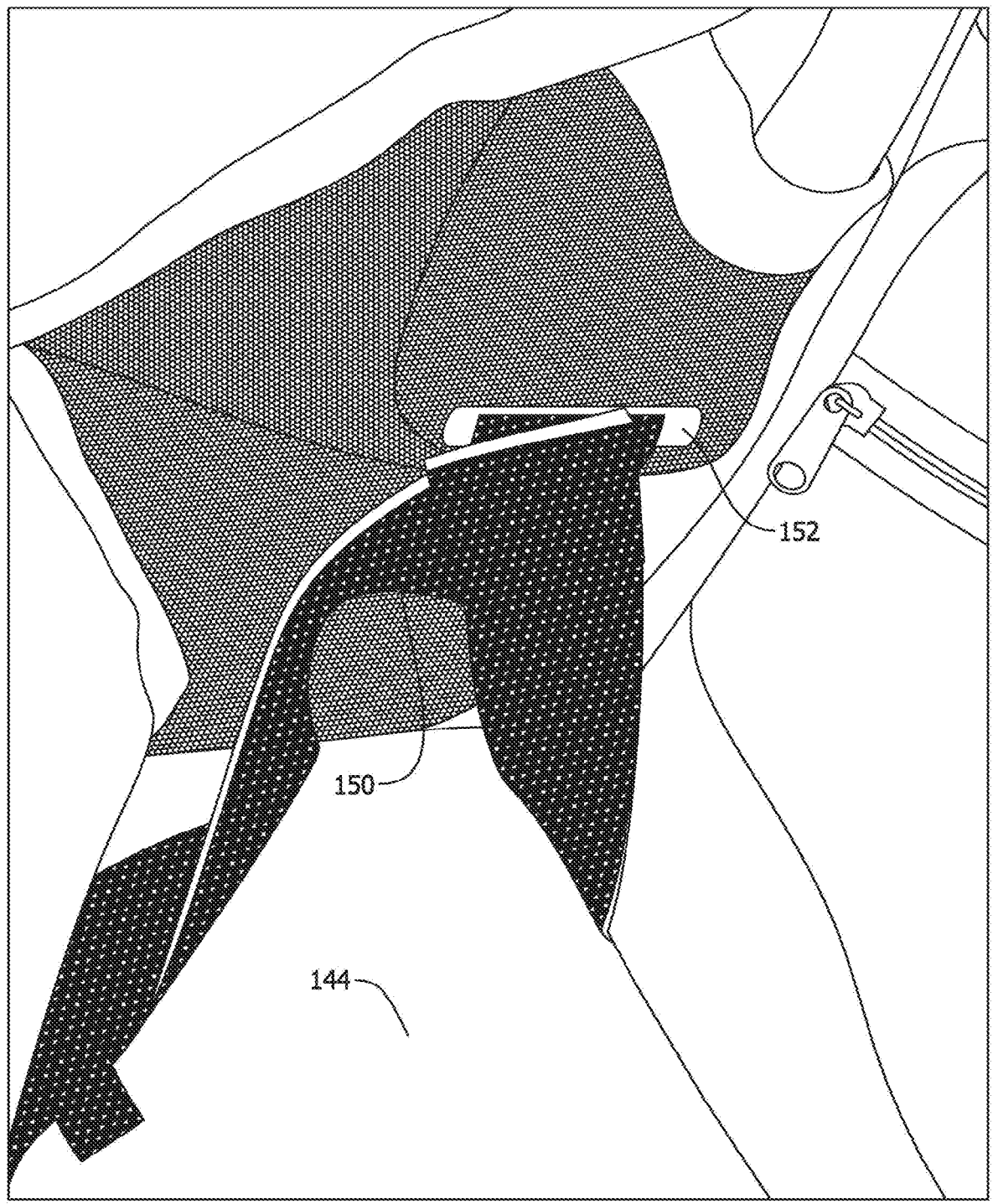
FIG. 11 shows a magnified view of a lifting mechanism for a pet platform, according to one exemplary embodiment.

The pet platform 144 may be raised and lowered within the interior 140 of the backpack by way of straps 150 (FIGS. 1-4). The straps 150 may wrap around the bottom of the platform 144 to provide a stable support for the platform 144 (see FIG. 11). As shown in FIGS. 2-4, for example, the straps 150 extend through openings 152 in side panels 105, 107. The user may raise the platform 144 by pulling the straps 150 through the openings 152. The platform 144 may be locked into position by way of a strap locking mechanism 151. In some embodiments, the platform 144 may include a mesh extending up from the platform 144 within the interior 140 to prevent the pet's legs from slipping between the inside of the panels 102, 103, 105, 107 and the platform 144 when the platform 144 is raised up away from the bottom 106 of the backpack 10. Other mechanisms for raising and lowering a platform within the backpack 10 may also be used.

The top portion 104 may include features to secure the pet snugly and comfortably with the backpack 10. For example, as shown in FIG. 7, a stretchable band 153 may be incorporated at the top 104 of the backpack 10 which is adjustable by a strap 154 as shown in FIG. 5. Strap 154 may include an elastic portion within the top portion 146 to form the stretchable band 153. The strap 154 may be secured and adjusted by the strap clip 156. Side adjustment straps 158 and cinches 160 may also contour the top portion 146 to secure the pet within the interior 140.

Figure 8A:
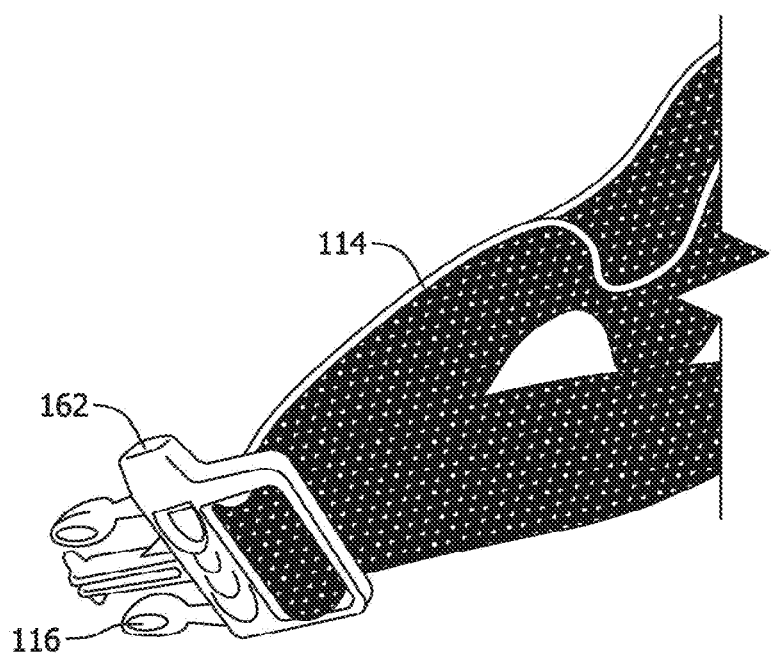
FIGS. 8A, 8B, and 8C show a clip and waist straps for a pet carrying backpack according to one embodiment.

FIG. 8A shows a clip for a pet carrying backpack according to one embodiment. One or more of the clips 116 for the sternum strap 114 may comprise a whistle 162 built into the side of the clip. The whistle 162 may be incorporated for safety reasons or to provide signals to the pet when the pet is not being carried in the backpack 10.

Figure 8B:
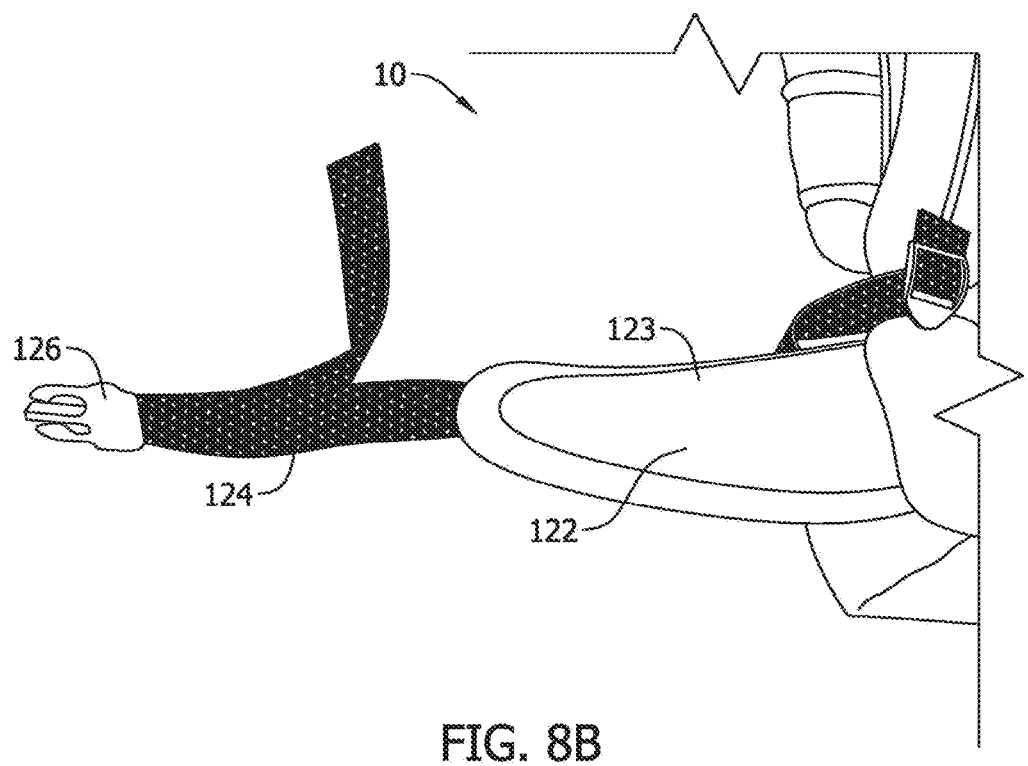
Figure 8C:
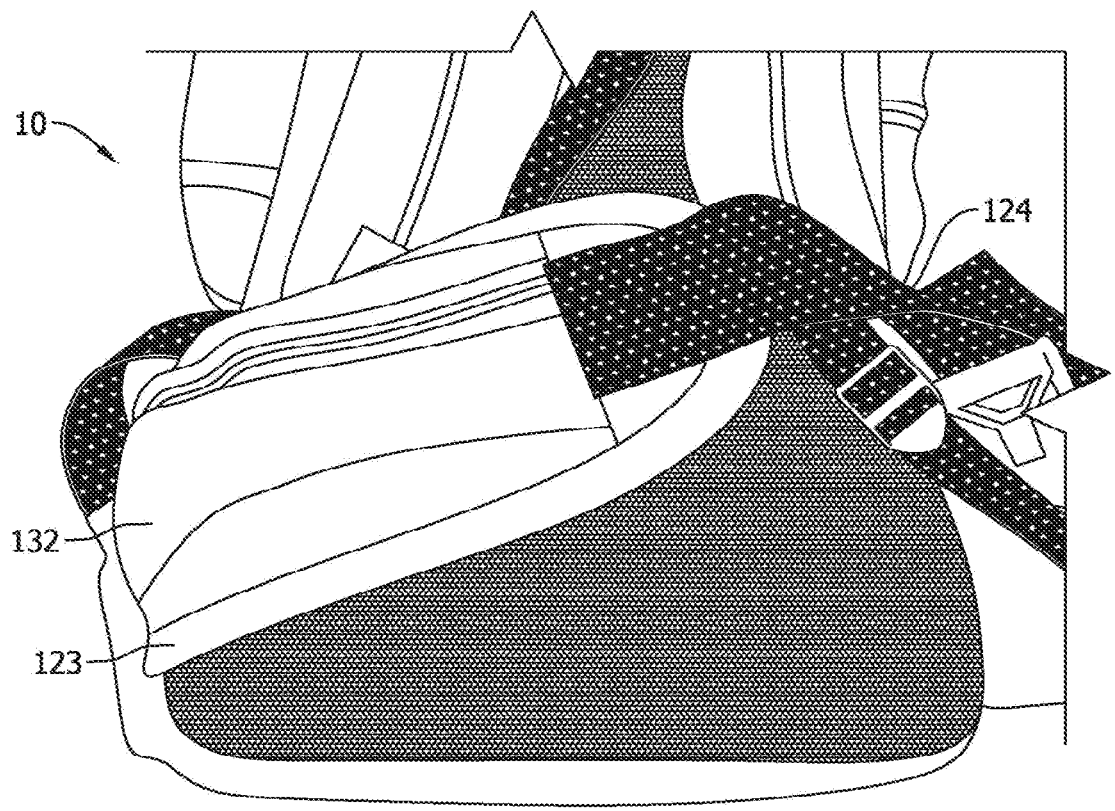

FIG. 8B and FIG. 8C show waist straps for a pet carrying backpack. The backpack 10 further comprises waist straps 122. The waist straps 122 may be comprised of a padded support member 123 and a strap member 124 (FIG. 7). The waist straps 122 are selectively connected about the user's waist via clips 126 (FIG. 7). The padded support member 123 of the waist straps 122 may comprise a zipper providing access to a pocket 132. When worn about the user's waist, the pocket 132 may provide easy access to smaller, personal items such as keys or a cell phone.

Figure 9:
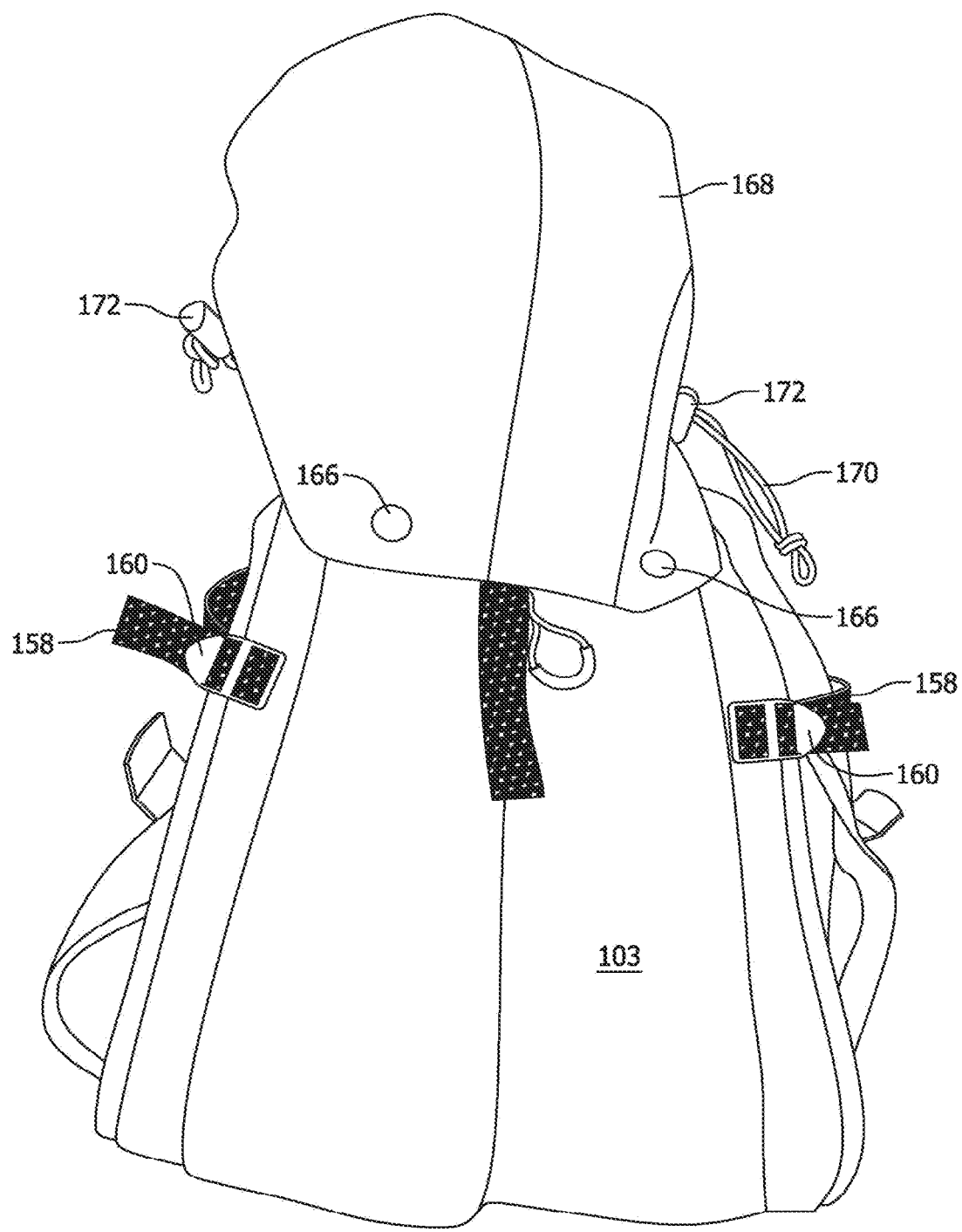
FIG. 9 shows a back view of a pet carrying backpack with a rain hood, according to one exemplary embodiment.
Figure 10:
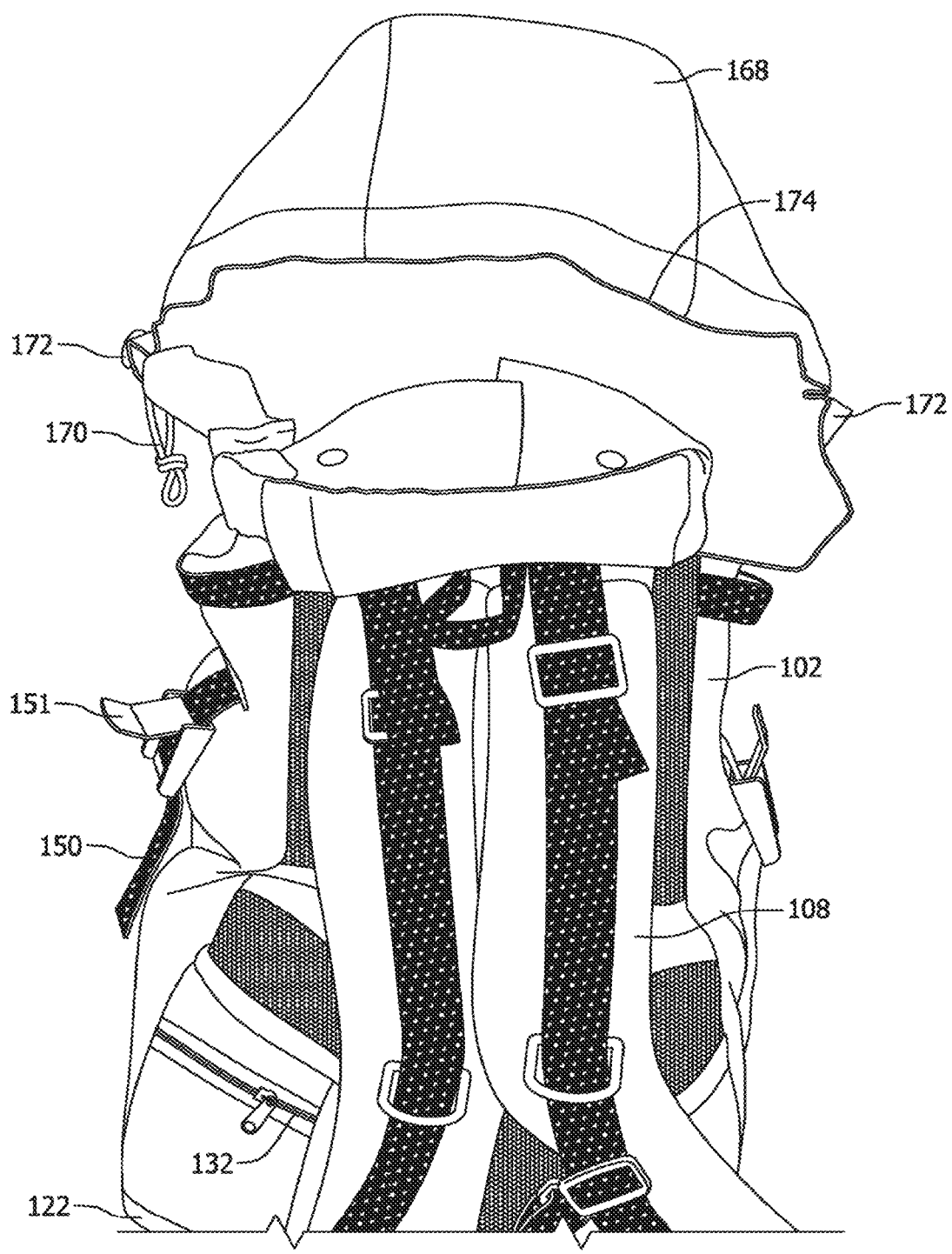
FIG. 10 shows a front view of the pet carrying backpack of FIG. 9.

FIGS. 9 and 10 show a pet carrying backpack with a rain hood, according to one exemplary embodiment. As shown in FIG. 9, the backpack 10 may include a rain hood 168. The backpack body 100 may comprise one or more snaps 164 (FIG. 5), for example on the back panel 103 of the backpack 10. The snaps 164 may correspond to snaps 166 of the hood 168. The hood 168 may thus be fastened to the top 104 of the backpack 10 to provide rain protection to the pet.

The hood 168 may be adjusted to stay in place over the pet's head by an elastic cord 170 that extends through a front side 174 of the hood 168. The elastic cord 170 is adjusted by way of the locking mechanisms 172. In some embodiments, the hood 168 may have a designated compartment within the backpack 10 for storage when not in use. In other embodiments, the hood 168 may be stored underneath the pet platform 144.

Figure 12A:
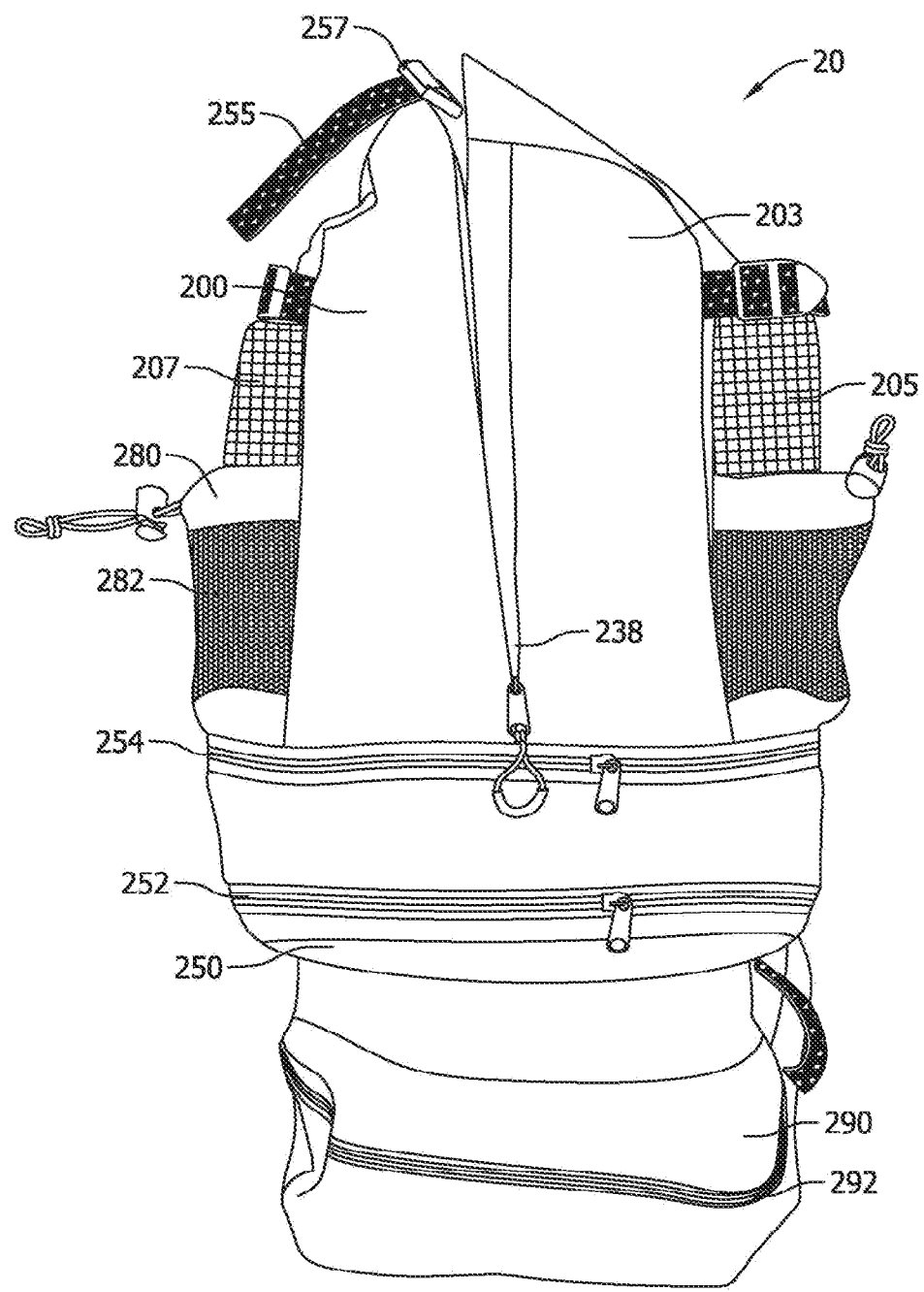
FIG. 12A and FIG. 12B show a pet carrying backpack with an adjustable pet platform, according to an exemplary embodiment.
Figure 12B:
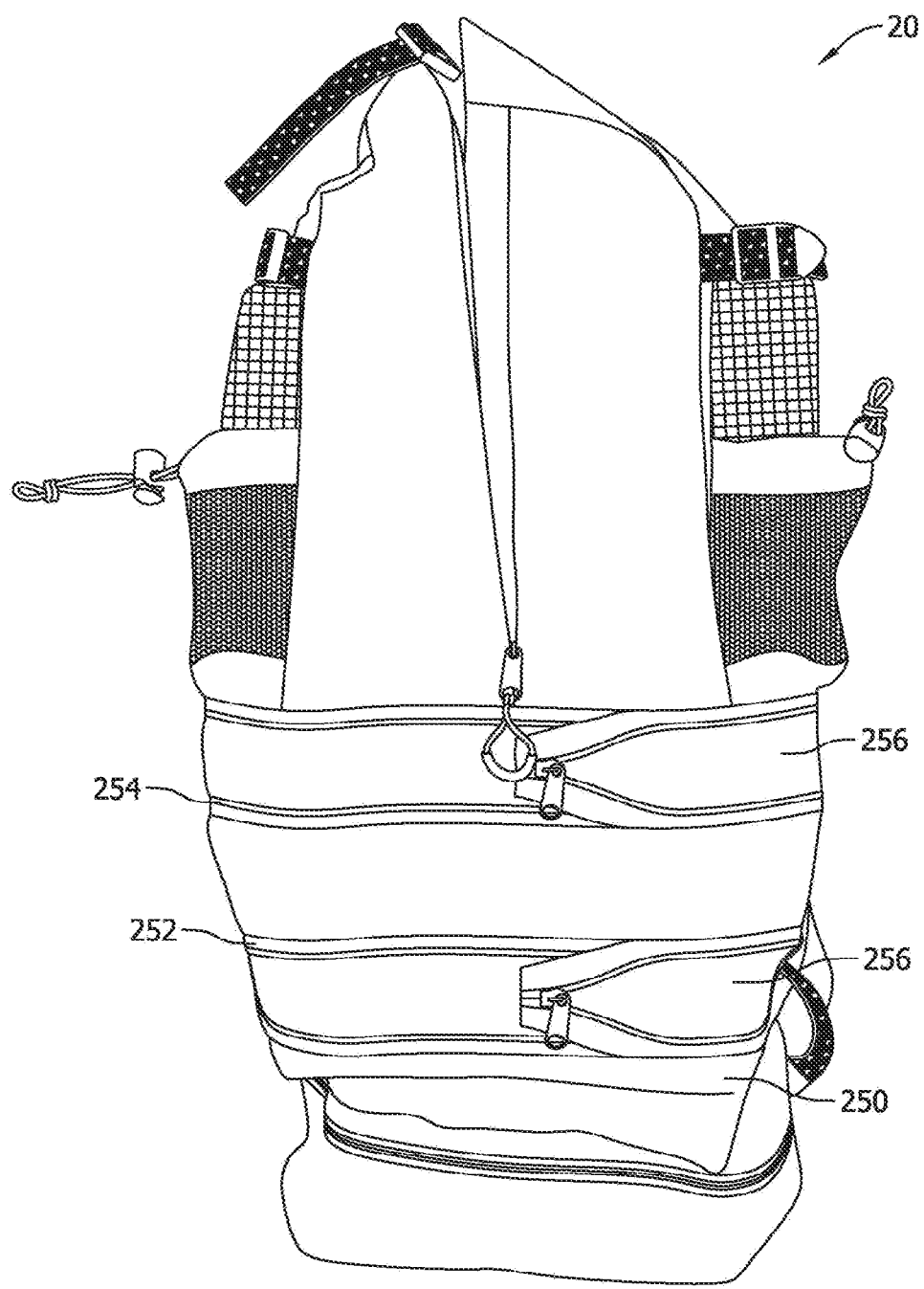

FIG. 12A and FIG. 12B show a pet carrying backpack with an adjustable pet platform, according to an exemplary embodiment. FIG. 12A shows a pet carrying backpack 20. The pet carrying backpack 20 shares many similar features as the backpack 10 described above, so a full description of like features will largely be omitted.

The pet carrying backpack 20 is formed of a backpack body 200 that defines an internal compartment in which a pet may be carried. Like the backpack 10, the backpack 20 has a front panel 203 which may be separated via a zipper 238 to facilitate ingress and egress of a pet into the internal compartment.

In this embodiment, the side panels 205, 207 are comprised mainly from a webbed material. For example, the webbed material may be formed from a polymer thread which is coated with a silicone coating. The webbed material allows for largely unobstructed airflow into the interior of the backpack 20 help keep a pet riding therein cool. Side pockets 280 may be provided over the side panels 205, 207 to hold water bottles, sport drinks, or the like. The side pockets 280 may have a mesh portion 282 so that the pockets also allow airflow through to webbed material, and then to the interior. That is, the mesh material 282 of the pockets at least partially overlaps the webbed side panels 205, 207 to provide ventilation along a substantial length of the side panels 205, 207.

The backpack 20 also facilitates an adjustable platform 250 to accommodate pets of different sizes. The platform 250 at a bottom of an internal compartment is adjusted via zippers 252 and 254. By unzipping the zippers 252, 254, the platform may be lowered, increasing the size of the internal compartment. FIG. 12B shows the backpack 20 with the platform in a lowest position. With the zippers 252, 254 unzipped, extra material 256 can expand, lowering the platform 250 and increasing the size of the internal compartment. By using the two zippers 252, 254, the platform may be adjusted from a highest position, as shown in FIG. 12A, to a lowest position, as shown in FIG. 12B, to an intermediate position where only one of the two zippers 252, 254 is unzipped.

To provide added storage, the backpack 20 may include a lower compartment 290 accessed via a zippered opening 292 (FIG. 12A). This allows the user to store other items while carrying the pet. The lower compartment 290 is spaced sufficiently from the platform 250 so that the platform 250 has room to lower down to the lowest position (FIG. 12B).

The backpack 20 may comprise an internal frame to support the backpack 20. For example, an aluminum beam may extend vertically through the interior of the backpack to provide rigidity. One or more interior plastic panel may extend from the beam to frame the front of the backpack 20. Similarly, as explained above, the platform 250 may comprise a pad and a plastic frame member providing a stable and rigid platform for the pet within the backpack 20. The frame materials may include materials other than the aluminum and plastic described herein. The frame materials are configured to be lightweight, durable, and waterproof to facilitate case of use of the backpack 20.

Figure 13:
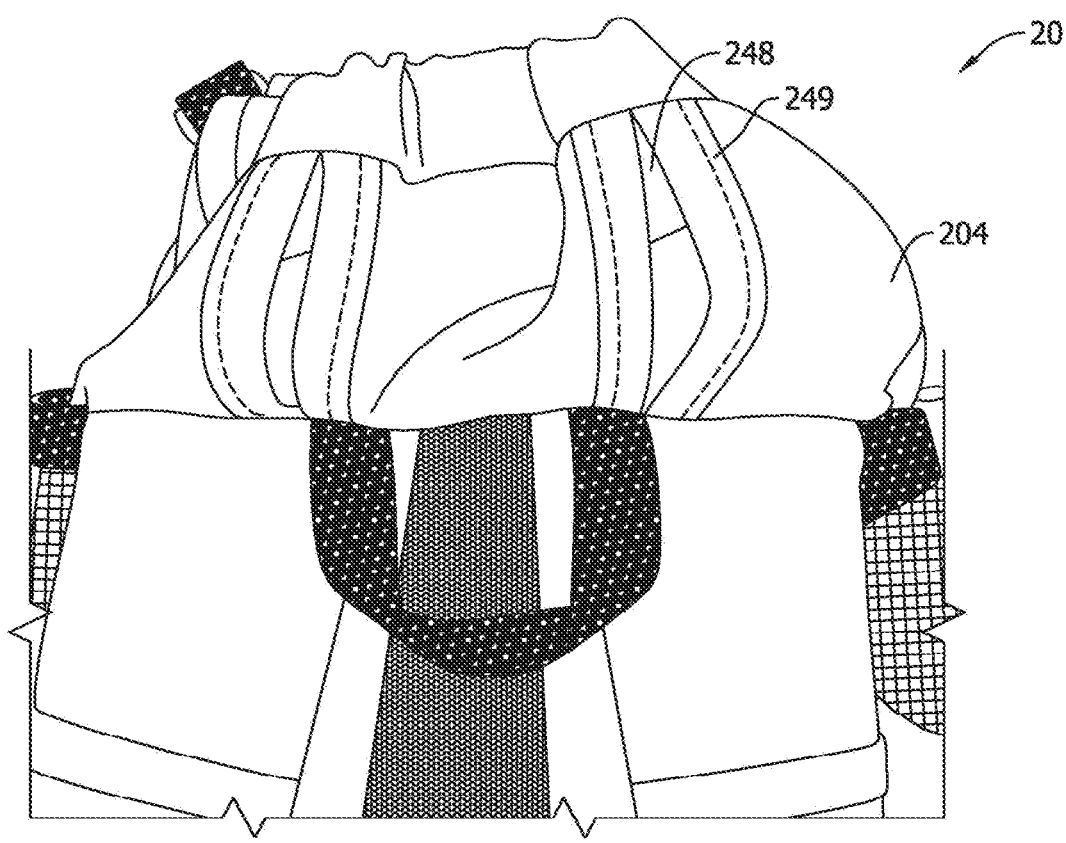
FIG. 13 shows a front view of an upper portion of the pet carrying backpack of FIGS. 12A and 12B, according to an exemplary embodiment.

FIG. 13 shows a front view of an upper portion of a pet carrying backpack, according to an exemplary embodiment. Like the backpack 10, the backpack 20 includes paw holes 248 in a top portion 204 so that the pet can extend its paws through the bag for a comfortable ride. The paw holes 248 are reinforced with neoprene or polychloroprene to provide resilience to the paw holes 248 and to increase the comfort of the pet.

Figure 14:
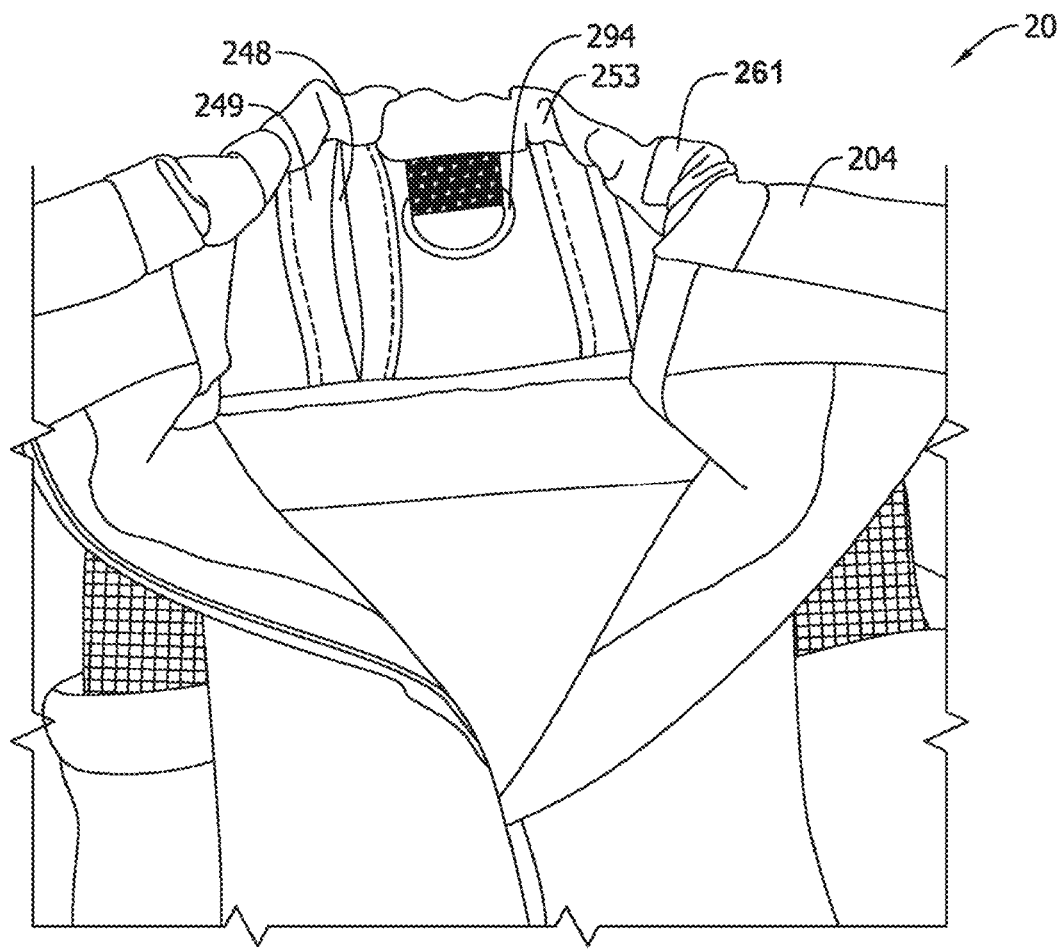
FIG. 14 shows a back view of an upper portion of the pet carrying backpack of FIGS. 12A and 12B, according to an exemplary embodiment.

FIG. 14 shows a back view of an upper portion of a pet carrying backpack, according to an exemplary embodiment. Here, the paw holes 248 reinforced by neoprene 249 are again shown. Further, the top portion 204 includes a stretchable band or collar 253 at the top end of the top portion 204. This collar 253 surrounds the pet's neck or upper body to keep the pet within the internal compartment. A strap 255 and clip 257 (FIG. 12A) is used to tighten and loosen the collar 253. The top portion 204 and collar 253 may also include a stretchable portion 261 that further aids in the breathability and formability of the collar 253 around the pet's neck or upper body. A d-ring 294 is also provided which can attach to a pet's collar to keep the pet from jumping out of the bag.

Figure 15:
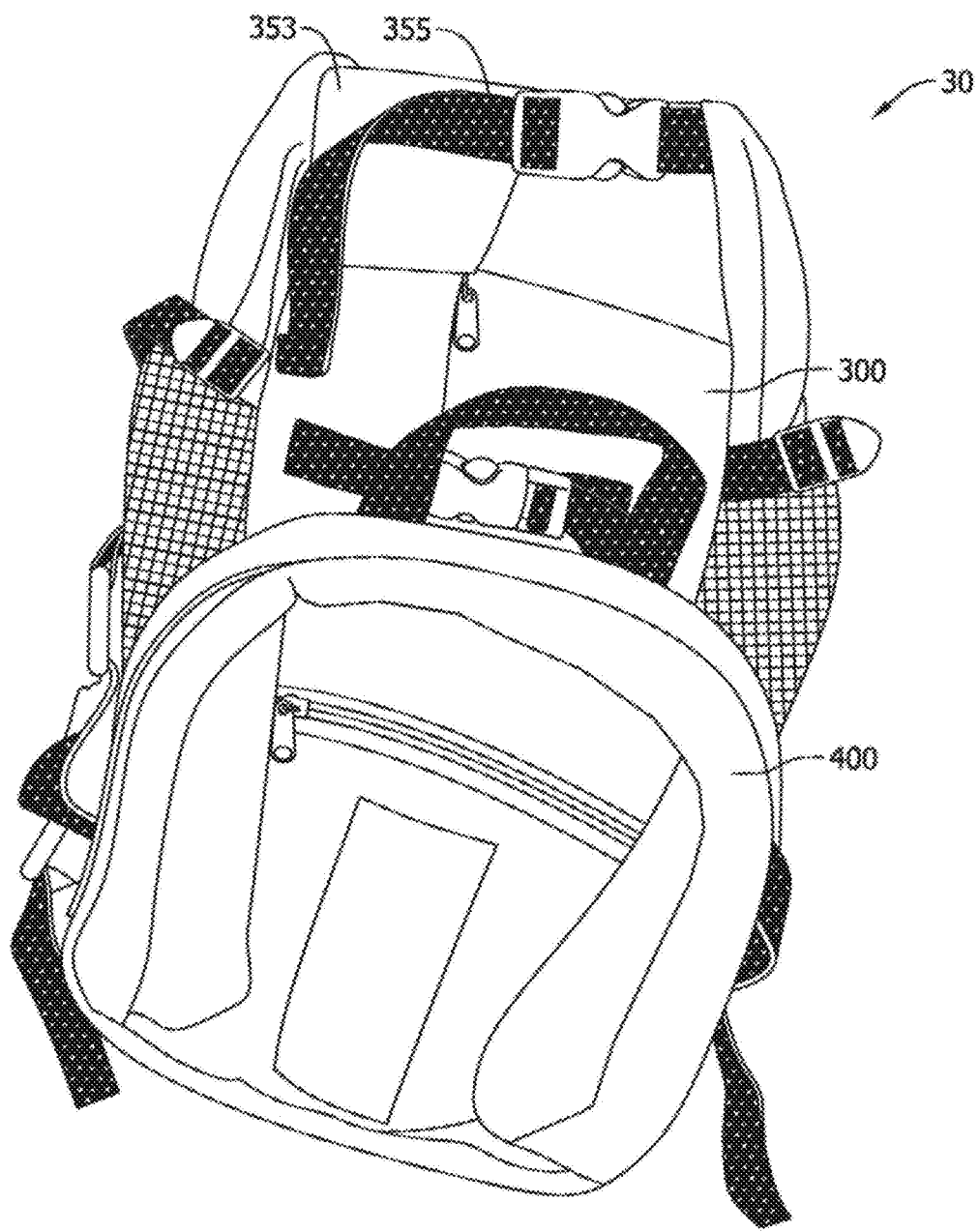
FIG. 15 shows a pet carrying backpack with a clip-on bag, according to an exemplary embodiment.

FIG. 15 shows a pet carrying backpack with a clip-on bag, according to an exemplary embodiment. A backpack 30 is similar to the backpacks 20 and 10 in many aspects, and thus a detailed explanation of similar features is omitted here for brevity. For example, the backpack 30 includes a body 300 defining an internal compartment in which a pet may be carried, and a collar 353 at the top with an adjustable strap 355 to fit around a pet's neck or upper body.

Figure 16:
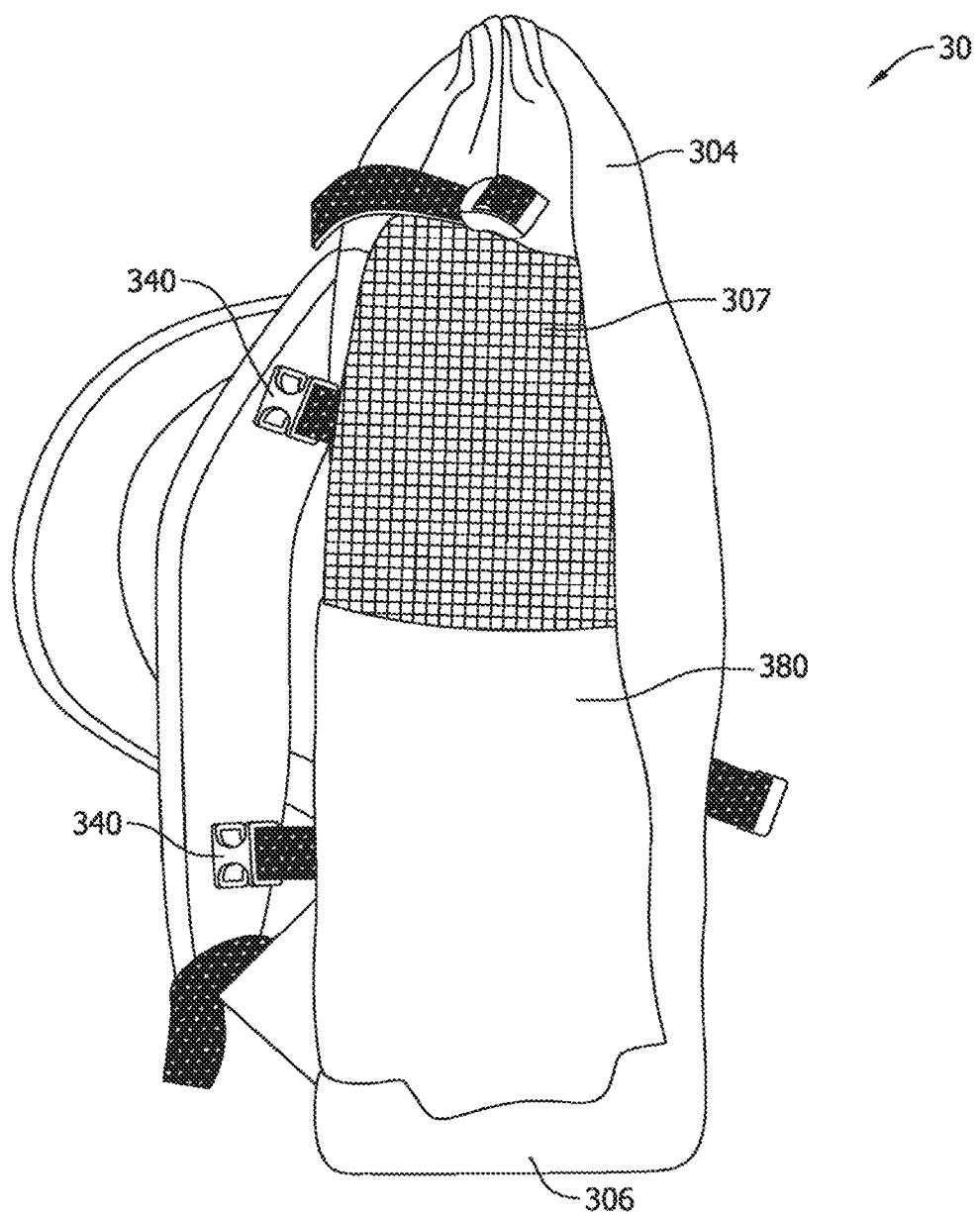
FIG. 16 shows a side view of the pet carrying backpack of FIG. 15, according to an exemplary embodiment.

The backpack 30 further comprises a clip-on bag 400. The clip-on bag 400 includes various compartments as are typically provided in various bags. FIG. 16 shows a side view of a pet carrying backpack, according to an exemplary embodiment. Here, clips 340 are disposed on the side panel 307 (and on the opposite side panel) to which the clip-on bag 400 attaches. The clips may be adjustable to tighten or loosen the fit between the backpack 30 and the clip-on bag 400. Similar to backpack 20, the backpack 30 comprises a webbed side panel 307 and mesh pocket 380. The webbed side panel extends from the top portion 304 to the bottom panel 306 providing ventilation substantially throughout the side panel 307. A similar side panel is on the opposite side, though not shown in this figure.

Figure 17:
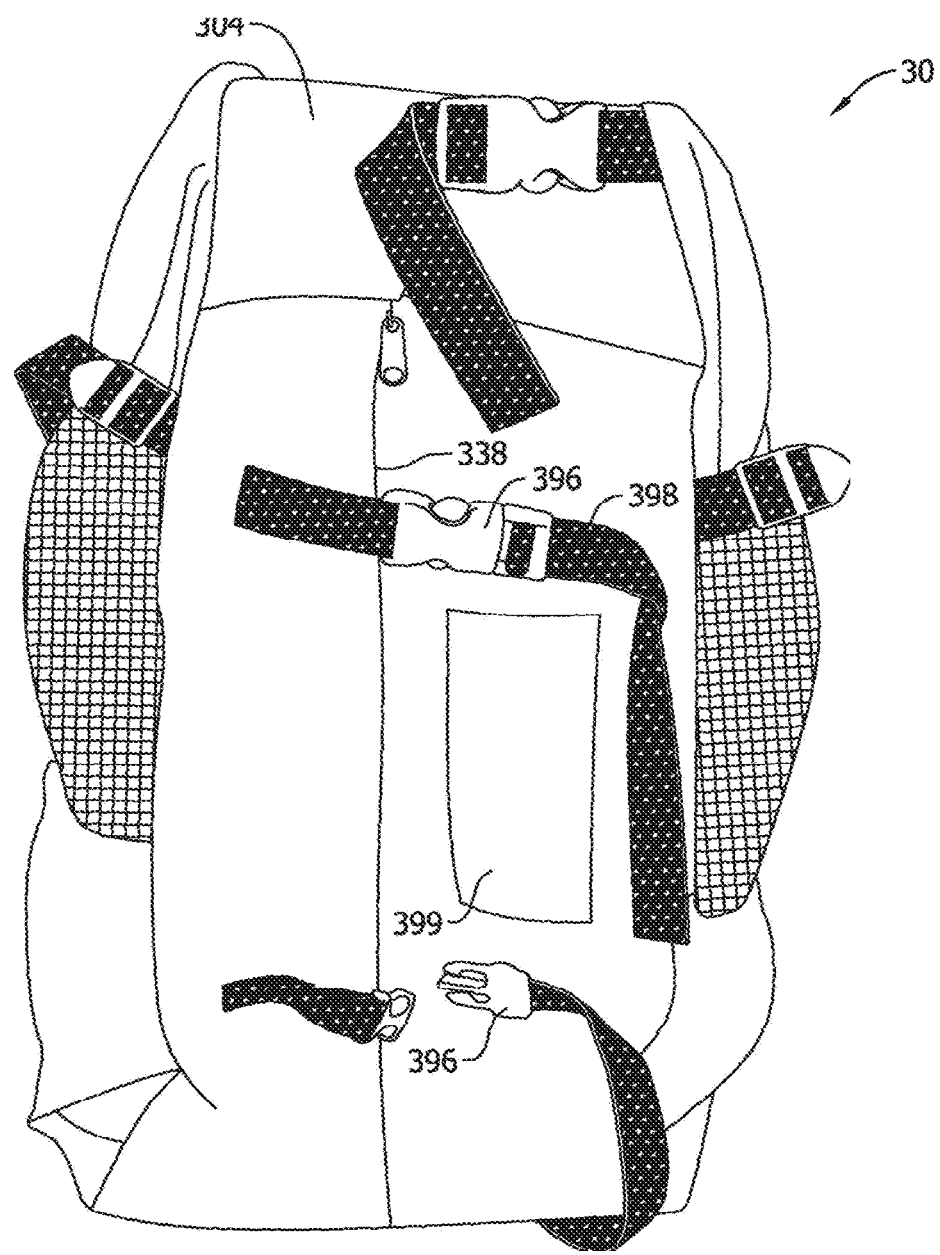
FIG. 17 is a front view of the pet carrying backpack of FIG. 15, according to one exemplary embodiment.

FIG. 17 is a front view of a pet carrying backpack, according to one exemplary embodiment. The backpack 30 further comprises adjustable contouring clips 396. The clips 396 attach to contouring straps 398 that extend across the front zipper 338 to adjust the size of the backpack 30 to fit and contour the backpack 30 around various sized pets.

In some embodiments, the backpack 30 may include one or more elongated retainer surfaces 399 on which accessories may be placed and held by a fastening medium included on the surfaces 399. For example, the retainer surface 399 may include hook or loop, and a corresponding accessory may include loop or hook (a compatible fastening surface) so that the accessory can be fastened and securely retained. Example accessories could include patches, labels, lights, or other items.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A pet-carrying backpack, comprising:
a backpack body comprising an interior compartment configured to support a pet therein such that the pet is oriented toward the front of the backpack when worn by a user;
a collar defining a first opening configured to accommodate a head of the pet therethrough so that the head of the pet is oriented to face a back of the head of the user of the backpack;
a second opening disposed beneath the first opening, the second opening configured to accommodate a paw or leg of the pet therethrough so that the paw or leg of the pet rests on the back or shoulders of the user;
shoulder straps extending from the backpack body beneath the collar, the first opening, and the second opening;
clips attached to the backpack body; and
a clip-on bag selectively attachable to and detachable from the backpack body via the clips, the clip-on bag comprising a storage compartment.

2. The pet-carrying backpack of claim 1, wherein the collar is adjustable to conform about a neck of the pet.

3. The pet-carrying backpack of claim 1, wherein the backpack body comprises a rear panel, the rear panel being openable by a vertical zipper to facilitate ingress and egress of the pet into the interior compartment.

4. The pet-carrying backpack of claim 1, further comprising at least one contouring strap disposed on the backpack body configured to shape the interior compartment of the backpack.

5. The pet-carrying backpack of claim 1, wherein the backpack body comprises vents extending along side panels of the backpack body, the vents comprising a webbed material.

6. The pet-carrying backpack of claim 1, further comprising a handle disposed above the shoulder straps and below the second opening.

7. The pet-carrying backpack of claim 1, wherein the second opening comprises at least one paw hole disposed below the collar and above the shoulder straps.

8. A pet-carrying backpack comprising:
a backpack body comprising an interior compartment configured to support a pet therein;
shoulder straps disposed on and extending from a front of the backpack body;
at least one opening in the backpack body disposed above the shoulder straps, the at least one opening being configured to accommodate a paw or leg of the pet;
clips attached to the backpack body; and
a clip-on bag that is selectively attachable to and detachable from the backpack body via the clips.

9. The pet-carrying backpack of claim 8, further comprising one or more contouring straps disposed on the backpack body that are configured to shape the interior compartment of the backpack.

10. The pet-carrying backpack of claim 9, wherein the backpack body comprises a rear panel having a vertical zipper configured to facilitate ingress and egress to and from the interior compartment, the one or more contouring straps being configured to cross-over the vertical zipper.

11. The pet-carrying backpack of claim 8, wherein the backpack body comprises a bottom panel defining a pet platform with a frame member and a pad to support the pet within the interior compartment.

12. The pet-carrying backpack of claim 11, wherein the pet platform is adjustable to be raised and lowered to effectively change a size of the interior compartment.

13. The pet-carrying backpack of claim 8, further comprising a collar forming a top opening in a top portion of the backpack body, the collar being configured to allow a head of the pet supported in the interior compartment to protrude therethrough, the collar comprising an adjustable strap and a stretchable portion.

14. The pet-carrying backpack of claim 8, wherein the backpack body comprises a right-side panel and a left-side panel, a vent being disposed in each of the right-side panel and the left-side panel, each vent extending from a top to a bottom of the right-side panel and the left-side panel, respectively, to facilitate airflow within the interior compartment.

15. A pet-carrying backpack comprising:
a backpack body comprising an interior compartment configured to support a pet therein;
a collar defining a first opening configured to accommodate a head of the pet therethrough so that the head of the pet is oriented toward the front of the backpack when worn by a user;
shoulder straps disposed on and extending from the backpack body;
at least one second opening in the backpack body disposed above the shoulder straps and below the collar, the at least one second opening being configured to accommodate a paw or a leg of the pet; and an attachment ring disposed within the interior compartment above the shoulder straps and below the collar, the attachment ring being configured to attach to a pet's collar when the pet is in the interior compartment.

16. The pet-carrying backpack of claim 15, wherein the at least one second opening comprises a pair of paw holes, and wherein the attachment ring is disposed between the paw holes.

17. The pet-carrying backpack of claim 15, further comprising clips disposed on the backpack body, and a clip-on bag that is selectively attachable to and detachable from the backpack body via the clips.

18. The pet-carrying backpack of claim 15, further comprising one or more contouring straps disposed on the backpack body that are configured to shape the interior compartment of the backpack.

19. The pet-carrying backpack of claim 18, wherein the backpack body comprises a rear panel having a vertical zipper configured to facilitate ingress and egress to and from the interior compartment, the one or more contouring straps being configured to cross-over the vertical zipper.

20. The pet-carrying backpack of claim 19, wherein the backpack body comprises a right-side panel and a left-side panel, a vent being disposed in each of the right-side panel and the left-side panel, each vent extending from a top to a bottom of the right-side panel and the left-side panel, respectively, to facilitate airflow within the interior compartment.

* * * * *

UNITED STATES PATENT AND TRADEMARK OFFICE
CERTIFICATE OF CORRECTION

| | | |
|---|---|---|
| PATENT NO. | : 12,490,711 B2 | Page 1 of 1 |
| APPLICATION NO. | : 18/632597 | |
| DATED | : December 9, 2025 | |
| INVENTOR(S) | : Joseph Watson and Daniel Bussio | |

It is certified that error appears in the above-identified patent and that said Letters Patent is hereby corrected as shown below:

In the Specification

| | | |
|---|---|---|
| Column 5, | Lines 14-15, | change "include an clastic portion" to --include an elastic portion-- |
| Column 6, | Line 42, | change "facilitate case of use" to --facilitate ease of use-- |

Signed and Sealed this
Tenth Day of February, 2026

John A. Squires
*Director of the United States Patent and Trademark Office*